United States Patent [19]
Cottrell et al.

[11] Patent Number: 5,694,484
[45] Date of Patent: Dec. 2, 1997

[54] SYSTEM AND METHOD FOR AUTOMATICALLY PROCESSING IMAGE DATA TO PROVIDE IMAGES OF OPTIMAL PERCEPTUAL QUALITY

[75] Inventors: F. Richard Cottrell, South Easton; Bror O. Hultgren, III, Ipswich, both of Mass.

[73] Assignee: Polaroid Corporation, Cambridge, Mass.

[21] Appl. No.: 440,647

[22] Filed: May 15, 1995

[51] Int. Cl.$^6$ ................................. G06K 9/46
[52] U.S. Cl. ................................. 382/167
[58] Field of Search ............... 382/100, 112–113, 382/128, 130–132, 141, 254–255, 307, 309, 311, 232; 358/448–467, 452–453, 400, 474, 487, 504, 508, 518, 520–522, 527, 530, 534, 135, 136

[56] References Cited

U.S. PATENT DOCUMENTS

| | | | |
|---|---|---|---|
| 4,459,613 | 7/1984 | Faroudja | 358/167 |
| 4,831,434 | 5/1989 | Fuchsberger | 358/80 |
| 4,969,040 | 11/1990 | Gharavi | 358/136 |

(List continued on next page.)

FOREIGN PATENT DOCUMENTS

| | | | |
|---|---|---|---|
| 272 697 | 11/1990 | Czechoslovakia. | |
| 0414415A2 | 2/1991 | European Pat. Off. | G06F 15/72 |
| 0428790A1 | 5/1991 | European Pat. Off. | H04N 1/46 |
| 473414A3 | 3/1992 | European Pat. Off. | G06F 15/72 |
| 0 488 176 A2 | 6/1992 | European Pat. Off.. | |
| 0 255 128 B1 | 12/1993 | European Pat. Off.. | |
| 0583055A2 | 2/1994 | European Pat. Off. | G06F 15/68 |
| 60-216353 | 10/1985 | Japan. | |
| 61-208577 | 9/1986 | Japan | G06F 15/66 |
| 61-251966 | 11/1986 | Japan | G06F 15/62 |
| 63-303471 | 12/1988 | Japan | G06F 15/62 |
| 2-280459 | 11/1990 | Japan. | |
| 2-292681 | 12/1990 | Japan | G06F 15/66 |
| 3-40677 | 2/1991 | Japan. | |

OTHER PUBLICATIONS

Keddy et al. "DEDIP:A User–Friendly Environment for Digital Image Processing Algorithm Development", 1991, IEEE Conference on Communications, pp. 733–736.

(List continued on next page.)

*Primary Examiner*—Jose L. Couso
*Attorney, Agent, or Firm*—Robert A. Sabourin

[57] ABSTRACT

An image processing system that automatically optimizes the perceptual quality of images undergoing a series of selected image-processing operations. The automatic optimization capability allows the system to bypass expensive and time-consuming trial-and-error methods associated with interactive methods. The system consists of a set of image-processing operations, an architecture, and an intelligent control. These elements take into consideration profiles of sources from which the images are generated, profiles of intended applications, and the impact that image processing operations (individually or in concert) will have on perceived image quality. The analysis uses a body of relationships linking human perception of image quality with objective metrics (such as sharpness, grain, tone, and color) of image content. The relationships used are based upon extensive psychovisual testing, using human observers and photographic images. The intelligent control embodies the test results and thereby functions as a synthetic human observer. Controlling a collection of adjustable parameters in the requested image-processing operations, it works automatically to maximize subjective quality for the resulting picture. When optimal parameter values have been determined, the system then subjects the image data, itself, to the corresponding processing operations and provides an image to the end application. This is all achieved without operator intervention other than initially selecting the set of processing operations. The functionality of the system may be implemented in a variety of physical architectures, including computer workstations, and including communicating sets of discrete components in which the computations and control are distributed among the components.

31 Claims, 9 Drawing Sheets

U.S. PATENT DOCUMENTS

| | | | |
|---|---|---|---|
| 5,018,215 | 5/1991 | Nasr et al. | 382/155 |
| 5,042,073 | 8/1991 | Collot et al. | 382/123 |
| 5,048,095 | 9/1991 | Bhanu et al. | 382/9 |
| 5,111,285 | 5/1992 | Fujita et al. | 382/254 |
| 5,181,259 | 1/1993 | Rorvig | 382/36 |
| 5,185,673 | 2/1993 | Sobol | 358/296 |
| 5,200,816 | 4/1993 | Rose | 358/518 |
| 5,218,434 | 6/1993 | Vinck | 358/80 |
| 5,270,530 | 12/1993 | Godlewski | 250/208.1 |
| 5,414,782 | 5/1995 | Carasso | 382/270 |
| 5,436,734 | 7/1995 | Yamauchi et al. | 358/448 |
| 5,475,509 | 12/1995 | Okamoto | 358/518 |
| 5,517,581 | 5/1996 | Johnston et al. | 382/232 |

OTHER PUBLICATIONS

C.S. Williams et al. "A Visual Language for Image Processing", 1990, Proceedings of the 1990 Workshop on Visual Languages, pp. 86–91.

G.M. Quenot et al. "The ETCA Data–Flow Functional Computer for Real–Time Image Processing." IEEE 1992 International Conference on Computer Design pp. 492–495.

V. Cappellini et al. "Image Processing System Based on Object Oriented Design", Sixth Multidimensional Signal Processing Workshop, 1989 pp. 21–22.

J.C. Brailean, "Evaluating the EM Algorithm for Image Processing Using a Human Visual Fidelity Criterion", ICASSP 91, pp. 2957–2960.

SYSTEM AND METHOD FOR AUTOMATICALLY PROCESSING IMAGE DATA TO PROVIDE IMAGES OF OPTIMAL PERCEPTUAL QUALITY

FIELD OF THE INVENTION

The invention relates generally to the field of image processing and more particularly to arrangements for processing image data which may be provided by a number of diverse types of sources of image data, for use by a number of diverse types of downstream utilization elements, in accordance with image processing operations as specified by an operator.

BACKGROUND OF THE INVENTION

In the past, processing of, for example, photographic images often required use of complex and expensive optical systems, including myriad optical lenses and other elements, which enabled an operator to produce a number of special effects, and perform compositing and other operations. The integrity of such processing is clearly a function of the quality of the optical systems as well as the degree to which they are maintained over their lifetimes. Since these optical systems are clearly analog, it may be difficult to ensure that, for example, processing performed on one system can be accurately reproduced on other systems.

More recently, fast computers and fast digital logic circuitry have made digital processing of images feasible. Digital processing has a number of clear advantages. Digital systems are generally less expensive than high-quality analog systems, and require much less maintenance. In addition, different copies of the same digital system should, when processing the same data in accordance with the same series of operations, produce precisely the same results. Digital systems not only allow the special effects, compositing and other operations that were possible using the prior analog systems, but also allow for a number of other operations which can help to optimize the appearance of the images, including, for example, reduction of noise and sharpening of the images. The specific ones of these image-enhancement operations that are to be applied, as well as the degree to which specific image-enhancement operations are to be applied, are generally related to the specific devices which are used to record, or "acquire," the images, as well as the specific devices which are used to, for example, print or "render" the processed images, and may also be a function of the order in which these and other operations are to be applied. However, in view of the myriad types of devices, each having their own respective sets of acquisition and rendering characteristics, which may be provided to acquire and render images, as well as the myriad types of image-enhancement and other operations which an operator may wish to apply to an image, it is generally difficult to predict a priori the degree to which the image-enhancement operations should be applied to achieve an optimal image output by the rendering device.

More generally today one sits at a terminal with an image processing application program running and with a specific intent in mind (i.e. enlarge and send to printer X the best possible image for this purpose). On the basis of the monitor display one judges what is wrong and through a pull down menu selects an operation, like sharpening, to improve the image. The amount of sharpening that one chooses is a guess, and may be more or less efficacious depending on operator experience. When this is completed, by an iterative method, one may wish to resize the image and crop out a piece. Once this is accomplished, one may see that the sharpness accomplished by initial operations is no longer valid and that the image needs more sharpening. While carrying out this sharpening, the noise becomes a big problem and one tries to blur in some way until a compromise is achieved. Then when the image finally looks good, it is sent to the printer only to have the printer deliver an image quite different from the monitor in color, contrast, sharpness and grain. One then returns to the image on the monitor and changes it to differentially compensate for the printed image problems and tries a second print. The process recycles until one tires or gets an acceptable print. The process requires experience to be done well, and is very subjective, time consuming and frustrating.

SUMMARY OF THE INVENTION

The invention provides a new and improved arrangement for processing image data, provided by a number of diverse types of image data sources, for use by a number of diverse types of downstream utilization elements, in accordance with image processing operations as specified by an operator, with the processing being performed in accordance with reference image data as provided by the image data source and downstream utilization element.

In brief summary, the new image processing system receives image data from an image data source and performs a series of processing operations in connection therewith as identified by an operator to generate processed image data, and provides the processed image data to a downstream utilization element. The image processing system includes an image data processing section and a characteristic processing section. The image data processing section performs the actual image processing operations in connection with the image data input thereto, with the processing being performed in relation to processing operation parameter information. The characteristic processing section receives source and downstream utilization element characteristic information defining selected characteristics of the image data source and downstream utilization element and generates the processing operation parameter information in response to the image processing operations selected by the operator as well as the source characteristic information and downstream utilization element characteristic information. The characteristic processing section generates the processing operation parameter information so as to enable the image data processing section to generate the processed image data having selected optimal image characteristics.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

I. General Description

In psychovisual testing one quantifies the subjective opinions of humans on image quality by known methods such as category scaling or pair comparisons. These methods allow a numerical value to be associated with an image which represents the average quality of that image as judged by a group of observers. Further, the methods establish a numerical scale on which individual images may be placed. These techniques have been demonstrated to be reproducible, etc. and cross correlated with one another.

The image quality is principally defined by four image parameters: image sharpness, graininess, tonal rendition and color rendition. This is not meant to be a limiting definition in that size, borders, surface gloss, scene content also play a role. The four principal image parameters can be quantified by objective metrics and measured in the laboratory. For example, the sharpness of an imaging device may be characterized by its modulation transfer function, the granularity by its Wiener spectrum, its tonal reproduction by its characteristic curve and its color reproduction by a color difference metric such as $\Delta E^*$ of the $L^*,a^*,b^*$ color specification system.

It is most advantageous to select objective metrics that correlate with the human observation of the quality of the image. Thus, one can advantageously select a sharpness metric that "eye weights" the characterizing modulation transfer function sharpness data as described below. Many such metrics have been proposed that correlate with the subjectively defined image quality. One such metric, which will be described later, is a subjective quality value, or "SQV." Likewise one can characterize each of the four major image quality variables with objective metrics which correlate with image quality. One can calculate the overall system objective metric given the characteristic metrics of the input device, the output device and the image processing steps involved in the chain. Given the characterization of the system metrics for the four principle objective metrics, we then calculate the image quality expected for such an image based on our previously defined correlations relating subjectively defined image quality to these objective metrics. Since the system as defined above contains the image processing steps, which are parametrically controlled, it is possible to search out an optimum set of parameters.

Figure 1:
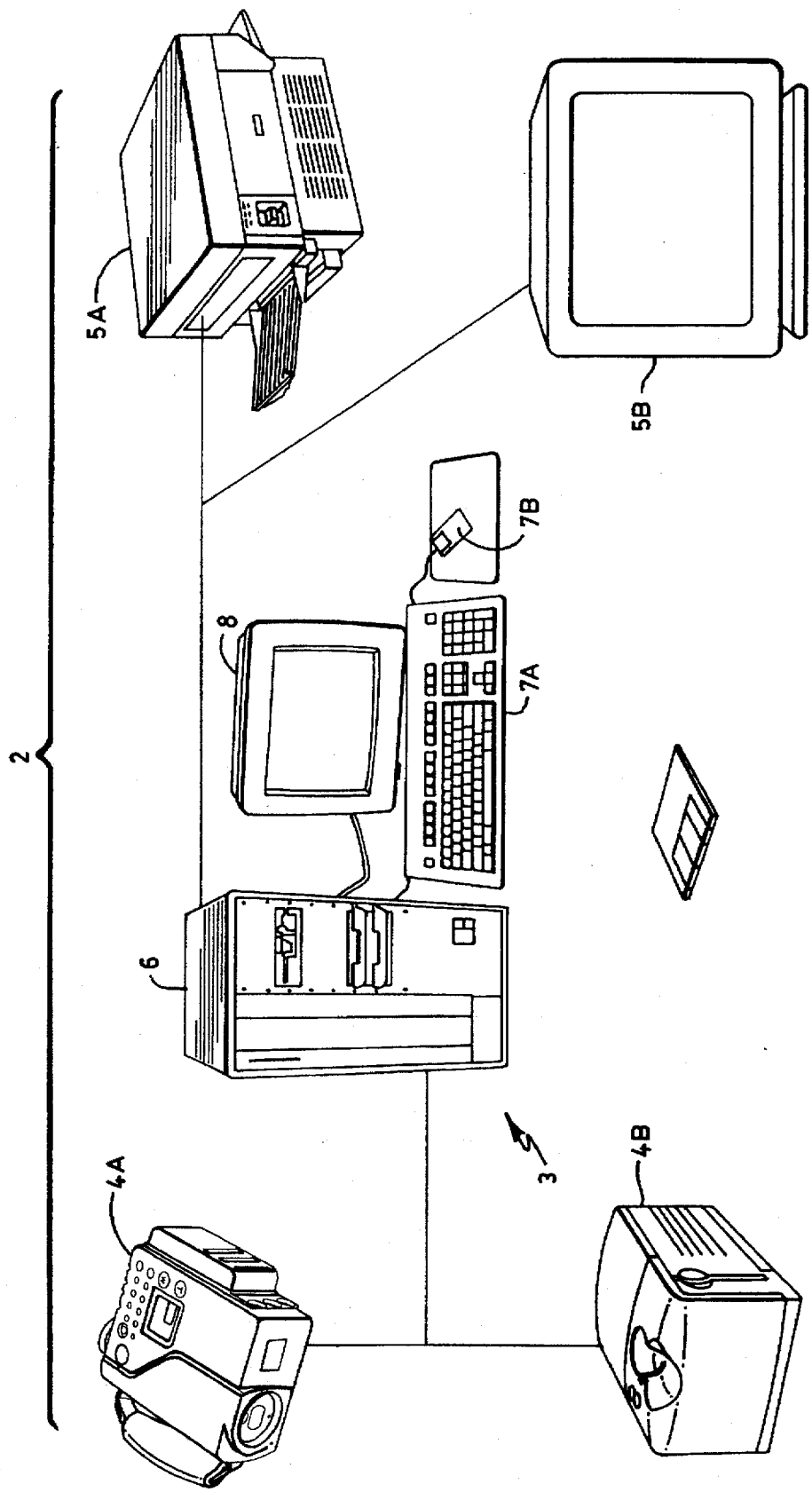
FIG. 1 is a diagram of an image acquisition and rendering system including an image processing system constructed in accordance with the invention.

FIG. 1 is a diagram of an image acquisition and rendering system 2 that includes one embodiment of an image processing system 10 (shown below in FIG. 2) that is constructed in accordance with the invention. With reference to FIG. 1, the image acquisition and rendering system 2 in one embodiment includes a computer 3, one or more image acquisition devices represented by a camera 4A and a document or page scanner 4B (generally identified by reference numeral 4), for acquiring an image and converting it to digital image data, and one or more image rendering devices represented by a printer 5A and a video output 5B (generally identified by reference numeral 5) for generating an output image. The computer 3, which in one embodiment is a general-purpose stored-program digital computer which comprises the image processing system 10, receives the digital image data and processes it as described below in connection with FIGS. 2 through 9 for, for example, rendering by an image rendering device.

As is conventional, the computer 3 includes a processor module 6 and operator interface elements comprising operator input components such as a keyboard 7A and/or a mouse 7B (generally identified by reference numeral 7) and operator output elements such as a video display device 8. The processor module 6 includes, for example, processor, memory and mass storage devices such as disk and/or tape storage elements (not separately shown) which perform processing and storage operations in connection with digital data provided thereto. When operating as the image processing system 10, the computer 3 will generally be processing certain programs which enable it to perform selected image processing operations as described below in connection with FIGS. 2 through 9 to process digital image data. The operator input elements 7 are provided to permit an operator to input information for processing, including information for controlling the image processing operations. The video display device 8 is provided to display output information to the operator, such as information identifying certain selections the operator may make in connection with the processing of the image data. Although the computer 3 is shown as comprising particular components, such as the keyboard and mouse for receiving input information from an operator, and a video display device for displaying output information to the operator, it will be appreciated that the computer system 3 may include a variety of components in addition to or instead of those depicted in FIG. 1.

In addition to comprising the image processing system 10, the computer 3 may also comprise a conventional computer graphics system for generating and editing an image in the form of digital image data. Digital image data generated by the computer graphics system may be processed in connection with the image processing system 10. In addition, processed digital image data that is generated by the image processing system 10 may be provided to the computer graphics system for editing. In connection with the computer graphics system, the computer 3 may process certain computer graphics programs that enable the operator to use the operator input components 7 to control generation of an image. Typically, the computer 3 will use the video display device 8 to display the image to the operator as it is being generated.

Although one embodiment of the image processing system 10 has been indicated as comprising elements of a general-purpose stored-program computer 3, it will be apparent to those skilled in the art that the image processing system 10 may alternatively include special-purpose hardware and/or program components, or a combination of a computer 3 with special-purpose hardware and/or program components.

Figure 2:
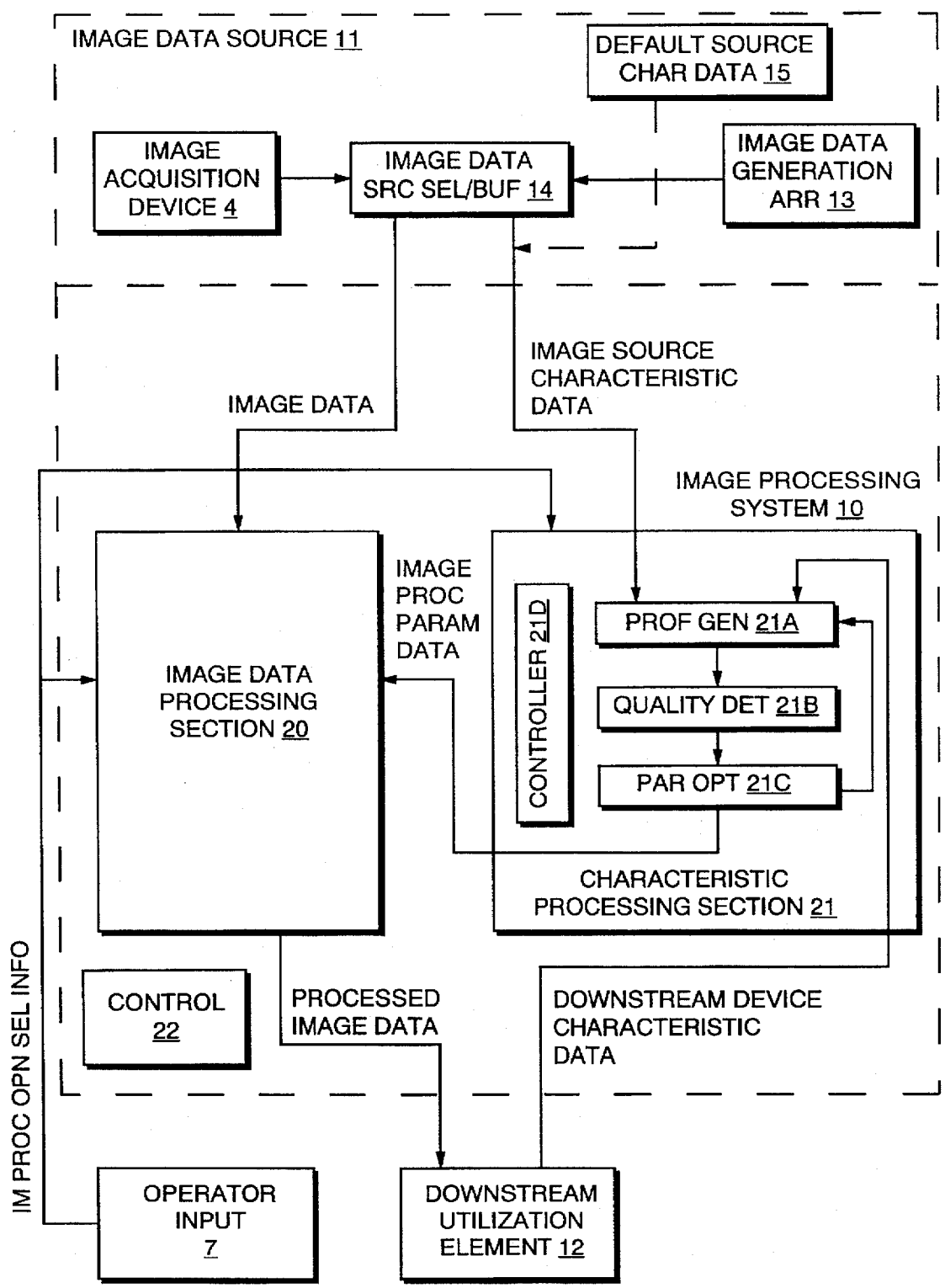
FIG. 2 is a functional block diagram of the image processing system forming part of the image acquisition and rendering system depicted in FIG. 1

FIG. 2 is a functional block diagram of the image processing system 10. With reference to FIG. 2, the image processing system 10 obtains image data defining an image from an image data source 11, processes it as described below, and provides the processed image data to a downstream utilization element 12. The image data source 11 may provide image data from an image acquisition device 4, or from an image data generation arrangement 13, such as the computer graphics system described above. In either case, the digital image data will generally be provided to image processing system 10 through a buffer 14 or other image data source selection arrangement. In one particular embodiment, in which the image processing system 10 processes image data in digital form, the image acquisition arrangement or other image data source will provide the image data in digital form, in which the image is represented by a multi-dimensional array of picture elements, or "pixels," each of which is associated with a corresponding point of the image. Each pixel is represented by digital data that defines, for example, the color and intensity of the pixel's corresponding point in the image. As is conventional, the digital data associated with each pixel may be in "RGB" format, in which the data associated with each pixel identifies the intensity of the colors red, green and blue of the pixel. Other conventional formats for representing digital image data are well known in the art.

The downstream utilization element 12 depicted in FIG. 2 may represent any of a number of types of elements or applications for using the processed image data generated by the image processing system 10 as described below. Illustrative downstream utilization elements include, for example, downstream applications such as the computer graphics systems, such as the computer graphics system described above in connection with FIG. 1, with which an operator can interactively edit an image represented by the processed image data. Other downstream utilization elements 12 may also include, for example, ink-jet or laser printing devices for rendering a hardcopy print of the image represented by the processed image data, systems for generating color separations for use in printing plants, or the like, or merely buffering or storage of the processed image data for future use.

The image processing system 10 processes digital image data for an image in relation to image source characteristic data representing selected characteristics of the particular image data source 11 which generated the image data for the system 10 and downstream utilization element characteristic data representing selected characteristics of the particular downstream utilization element 12 to utilize the processed image data, and image processing operation selection information provided by an operator. It will be appreciated that the downstream utilization element 12, when it receives the processed image data from the image processing system 10, may itself perform further processing in its operations, for example, in rendering an output image, and the image processing system 10 performs the processing so that the downstream utilization element 12 will, when it performs its processing, render an image having optimal characteristics in relation to the processing operations as specified by the operator. For example, if the downstream utilization element 12 is a printer for rendering images in hardcopy form, the processed image data may enable the printer to generate a rendered image having certain optimal visual characteristics. Similarly, if the downstream utilization element 12 generates color separations in response to the processed image data, the processed image data may enable the generation of color separations which, when used in a printing plant, will provide rendered images having similar optimal visual characteristics.

To accomplish that operation, the image processing system 10 includes an image data processing section 20 and characteristic processing section 21 both under control of a control element 22. The image data processing section 20 performs the actual processing operations as selected by the operator through the operator input 7 and represented by the image processing operation selection information, in connection with various processing parameters represented by image processing parameter information generated by the characteristic processing section 21. The characteristic processing section 21, in turn, generates the image processing parameter information in connection with the image source characteristic data describing the characteristics of the image data source 11, the downstream utilization element characteristic data and the particular processing operations selected by the operator as identified by the image processing operation selection information. The image processing parameter information generated by the characteristic processing section 21 enables the image data processing section 20 to generate processed image data representing an image having optimal visual or other characteristics when processed by the downstream utilization element 12.

The image data processing section 20 in one embodiment includes a number of elements which selectively process the image data under control of the operator. As will be described in detail below in connection with FIGS. 5 through 8, the elements include a number of image processing "atoms" each of which performs an image processing operation, in connection with image data provided thereto. Certain operations of the atoms will be controlled in response to values of the image processing parameter data generated by the characteristic processing section 21.

The characteristic processing section 21 generates the image processing parameter data in response to information describing certain characteristics of the image data source 11 and the downstream utilization element 12. The characteristics provide information as to processing performed by the particular image data source 11 in generating the digital image data in response to the image, and by the downstream utilization element 12 after receiving the processed image data. The characteristic processing section 21 includes an image processing profile generator 21A, an image quality value generator 21B and a parameter optimizer 21C, all controlled by a controller 21D, all of which will be described in detail below in connection with FIG. 9.

Preliminarily, the image processing profile generator 21A performs processing of the characteristic data from both the image data source 11 and the downstream utilization system 12 and further in response to trial parameters that are provided by the parameter optimizer 21C to generate certain processed reference values. The operations performed by the image processing profile generator 21A in connection with the characteristic data substantially conform to the image processing operations selected by the operator to be performed by the image data processing section 20 in connection with the image data, and so the processed reference values generated by the image processing profile generator essentially represent processing which would be performed by the image data processing section 20 in connection with an image corresponding to the reference image in response to those trial parameters. The image quality value generator 21B generates a single image quality metric value in response to the processed reference values generated by the image processing profile generator 21A. The parameter optimizer 21C receives the image quality metric value generated by the image quality value generator 21B and generates a new set of trial parameters which are again processed by the image processing profile generator. The image processing profile generator 21A, image quality value generator 21B and the parameter optimizer 21C repeat these operations through a series of iterations until the parameter optimizer determines that it has generated a set of values for the parameters that optimizes the image quality metric value generated by the image quality value generator 21B.

Figure 3:
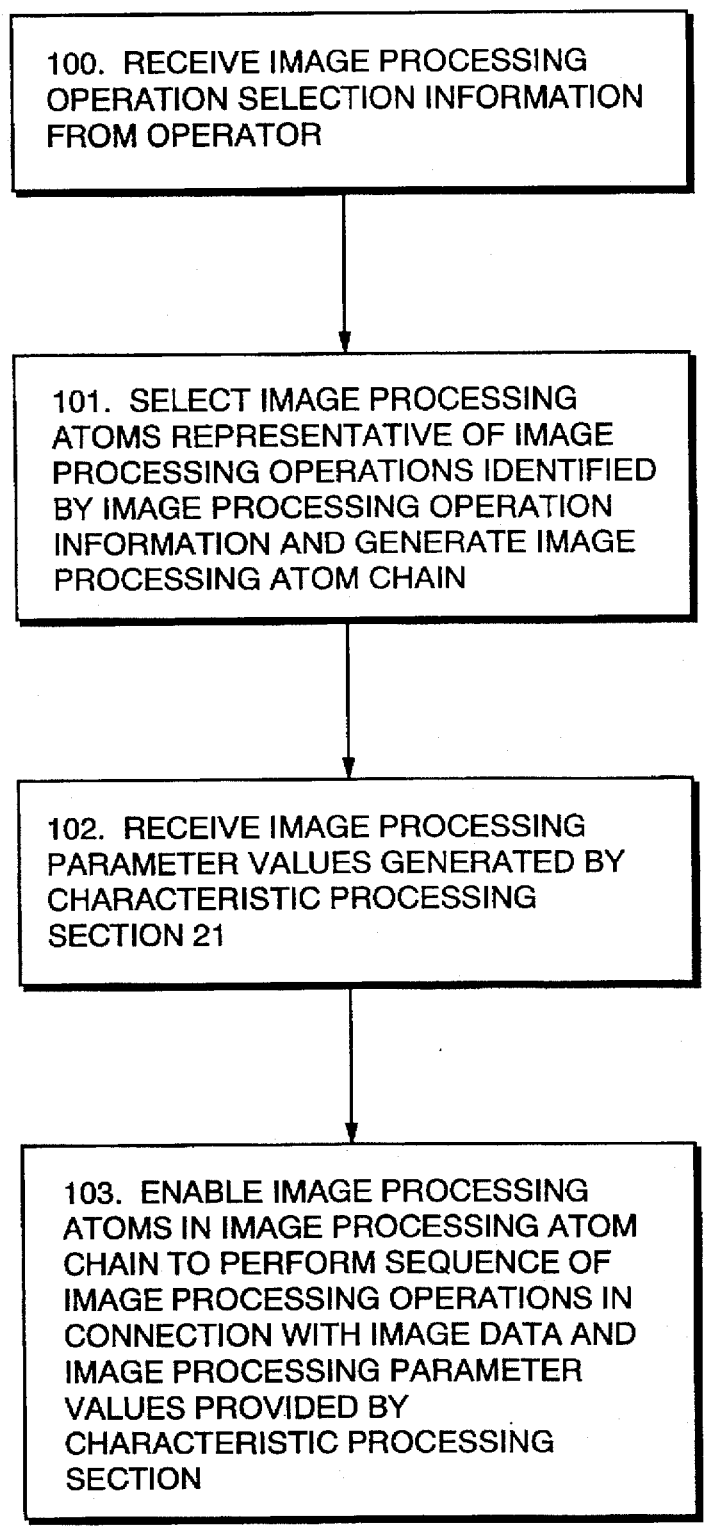
FIG. 3 is a flow chart depicting the general operations performed by an image data processing section comprising a portion of the image processing system depicted in FIG. 2.

With this background, the operations performed by the image data processing section 20 and the characteristic processing section 21, both under control of the control element 22, will be generally described in connection with the flow charts depicted in FIGS. 3 and 4, respectively. Operations performed by the image data processing section 20 and characteristic processing section 21 in connection with an illustrative specific sequence of image processing operations will be described in connection with FIGS. 5 through 8. With reference initially to FIG. 3, the image data processing section 20, under control of the control element 22, will receive the image processing operation selection information from the operator (step 100) and select image processing "atoms" which are representative of the image processing operations identified by the image processing operation selection information (step 101). Each of the "atoms" comprises an element that will perform an individual processing operation identified by the image processing operation selection information. In one embodiment, the atoms variously comprise special-purpose electronic hardware elements and/or a suitably programmed digital computer for performing the specified processing operations. The image data processing section 20, after selecting the image processing atoms, forms a chain of the image processing atoms to conform to the processing operation sequence defined in the image processing operation selection information (step 101).

At some point, after control element 22 has enabled the characteristic processing section 21 to generate the particular values of the processing parameters, it will enable the image data processing section 20 to receive the values from the characteristic processing section (step 102). After the image data processing section 20 establishes the processing operation atom chain (step 101) and receives the image processing parameter information (step 102), it enables the image processing atom chain to perform the sequence of image processing operations in connection with the image data from the image data source and the values of the processing parameters as defined in the image processing parameter information from the characteristic processing section 21 (step 103), thereby to generate the processed image data for use by the downstream utilization element 12.

Figure 4:
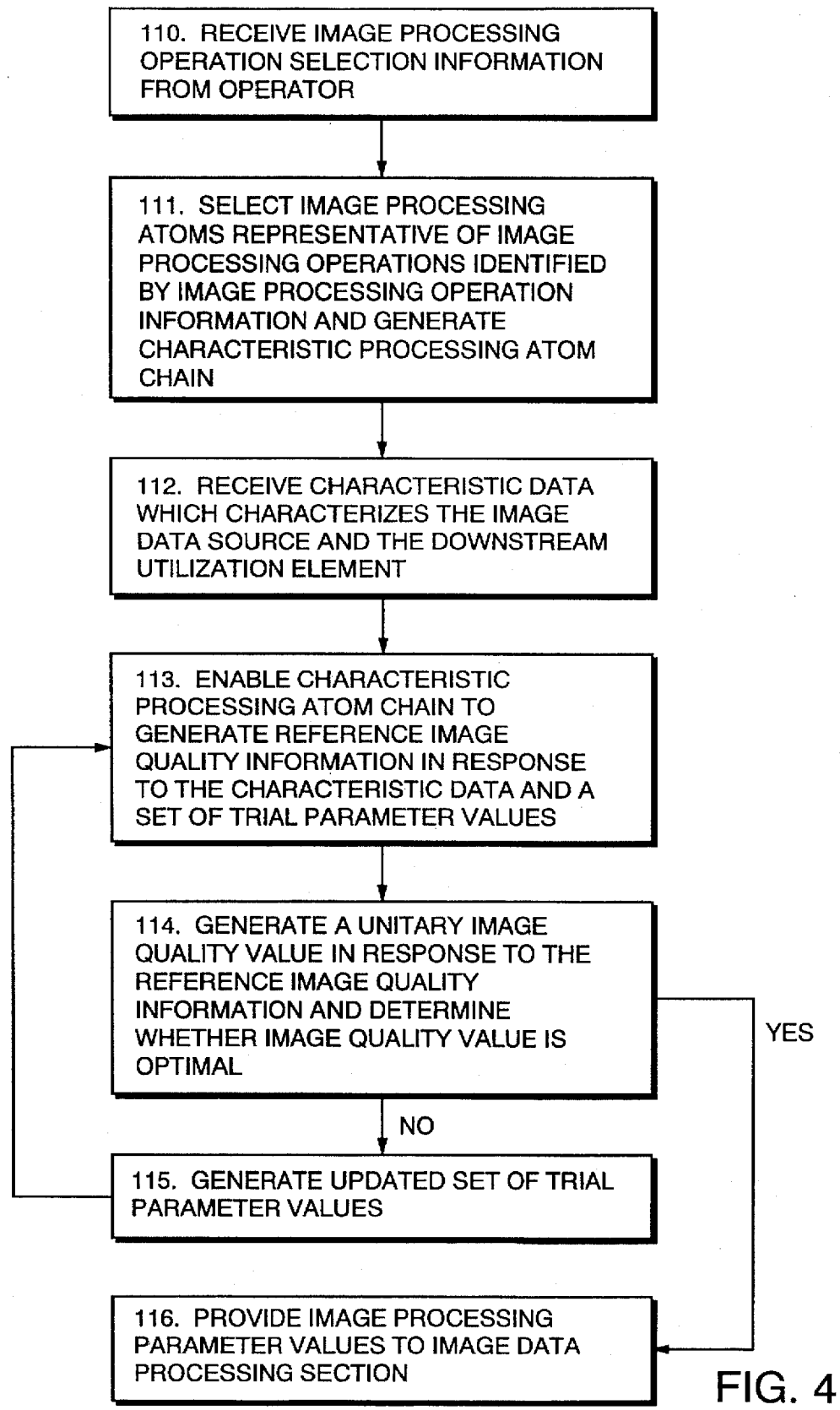
FIG. 4 is a flow chart depicting the general operations performed by a characteristic processing section comprising another portion of the image processing system depicted in FIG. 2.

The general operations performed by the characteristic processing section 21, under control of the control element 22, are depicted in FIG. 4. With reference to FIG. 4, the characteristic processing section 21, under control of the control element 22, will also receive the image processing operation selection information from the operator (step 110) and select image processing "atoms" which are representative of the image processing operations identified by the image processing operation selection information (step 111). As with the image data processing section 20, each of the "atoms" which may be selected by the characteristic processing section 21 will comprise an element that will perform an individual processing operation identified by the image processing operation selection information; in the one embodiment noted above in connection with FIG. 3 each atom comprises a special-purpose electronic hardware element and/or a suitably programmed digital computer for performing the specified processing operation. The characteristic processing section, after selecting the image processing atoms, forms a chain of the image processing atoms to conform to the processing operation sequence defined in the image processing operation selection information (step 111).

The control element 22 will also enable the characteristic processing section 21 to receive the image source characteristic data relative to the image data source 11 and the downstream utilization element characteristic data relative to the downstream utilization element 12 (step 112). After the characteristic processing section 21 obtains the image source and downstream utilization element characteristic data, the control element 21D will enable the characteristic processing section 21, in particular the image profile generator 21A as described above, to use the image processing atom chain, in one embodiment, along with other elements described below in connection with FIG. 9 and further in response to the set of trial parameter values provided by the parameter optimizer 21C, to generate reference image quality information (step 113). The controller 21D then enables the image quality value generator 21B to generate a single image quality value (step 114) and the parameter optimizer to determine whether the image quality value is an optimal value (step 114). If the parameter optimizer determines in step 114 that the image quality value determined by the image quality value generator 21B is not optimal, it generates a new set of trial parameter values (step 115) and the controller 21D returns to step 113 to enable generation thereby of new reference image quality information. The controller 21D enables the image processing profile generator 21A, image quality value generator 21B and the parameter optimizer 21C to repeat steps 113 through 115 until the parameter optimizer 21C determines in step 114 that the image quality value is optimal. At that point, the parameter optimizer 21C will sequence to step 116 to provide the image processing parameter values to the image data processing section 20.

The characteristic processing section 21 may obtain the image source and downstream utilization element characteristic data directly from the particular image data source, such as the image acquisition device 4 or the image data generation arrangement 13 (FIG. 2), and particular downstream utilization element 12 to which the image processing system 10 is connected, as indicated by FIG. 2. In that arrangement, the image data source 11, for example, may provide the image source characteristic data along with the image data, and, if the operator identifies the downstream utilization element 12 in the image processing operation selection information the control element 22 may enable the downstream utilization element 12 to provide the downstream utilization element characteristic data to the characteristic processing section 21 at some point before that section 21 uses the information to perform its operations.

Alternatively, the image data source 11 may provide default source characteristic data from a default source characteristic library 15 that it maintains which may provide default characteristic data which may be useful for all types of image acquisition devices 4 or image data generation arrangements 13, or it may provide default characteristic data for particular classes of such devices or arrangements. Alternatively or in addition, the image processing system 10 may maintain a library (not shown) of image source and downstream utilization element characteristic data for various types of image data sources 11 and downstream utilization elements 12, and the control element 22 can obtain the identifications of the particular type of image data source 11 and downstream utilization element 12 to be used and enable the image source and downstream utilization element characteristic data for the particular source 11 and downstream utilization element 12 to be provided to the characteristic processing section 21 from the library. The library may, in addition to storing image source and downstream utilization element characteristic data for specific types of image data sources 11 and downstream utilization elements 12, also include image source and downstream utilization element characteristic data for classes of sources 11 and downstream utilization elements 12 (such as photographic cameras, video cameras and the like for sources 11, and printers and display devices of various types or from various manufacturers for downstream utilization elements 12), as well as default characteristic data, and if it does not have characteristic data for the particular source 11 or downstream utilization element 12 it can provide the class characteristic data or default data to the characteristic processing section 21 for use in its processing.

It will be appreciated that the image processing system 10 provides a unified image processing system which will enable the processing and automatic enhancement of images provided by a wide variety of types of image data sources 11 to be provided to a wide variety of downstream utilization elements 12, in particular enabling visually optimal images to be rendered or displayed by a wide variety of printing or display devices in a wide variety of formats. The system 10 allows the operator to select the image processing operations to be performed by the image data processing section 20 in connection with the actual image data, and further provides for the processing to be performed in connection with parameters whose values are generated by the characteristic processing section 21. The characteristic processing section 21 generates the values of the various parameters comprising the image processing parameter data in accordance with principles developed from psycho-visual testing, and thus represents an expert synthetic image observer for the particular image data source that generated the image data, the particular destination utilization element that is to receive the processed image data, and the image processing operations to be performed by the image data processing section 20. The characteristic processing section 21 optimizes the values of the particular parameters that it generates to provide for an optimal image as produced by the characteristic processing section 21.

In one embodiment, the characteristic processing section 21 generates the image processing parameter data to control the portions of the image processing data chains generated by the image data processing section that affect the spatial attributes of an image whose image data is being processed. In that embodiment, the image data processing section 20 processes the portion of the image data comprising color information in accordance with color matching and tone reproduction arrangements as described below.

II. Detailed Description of Image Processing System 10

A. Image Data Processing Section 20

In one specific embodiment of the image processing system 10, which will be described in connection with FIGS. 5 through 9, the atoms used by the image data processing section 20 and the characteristic data processing section 21 are organized into "molecules," with each molecule comprising one or more selected atoms which are organized in a predetermined series, or chain, within the molecule. In that embodiment, the molecules are further organized into molecule classes, and the image data processing section 20 and characteristic data processing section 21, in response to the image processing operation selection information from the operator, will select a molecule from within each molecule class in establishing the image data or characteristic data processing chain. As will be described below, within each molecule class, the molecules will perform similar operations, but the atoms comprising the molecules within each molecule class will generally perform the operations differently; in one embodiment some molecules within a molecule class may perform the operations faster, but with somewhat reduced quality than other molecules, and the operator may, through the image processing operation selection information, select the processing speed and quality with which the particular operation is to be performed. The image data processing section 20 and characteristic processing section 21 will use that image processing operation selection information to select a molecule within each molecule class to be used in forming the image data and characteristic data processing chain to be used in a particular image data processing operation. In addition, each molecule includes "atom actuator/deactuator" arrangements, which are also controllable in response to the image processing selection information provided by the operator, that enable each atom within the molecule to be enabled or disabled so that the operator can effectively selectively enable or disable atoms within the image data and characteristic data processing chain that is established in response to the image processing operation selection information.

Figure 5:
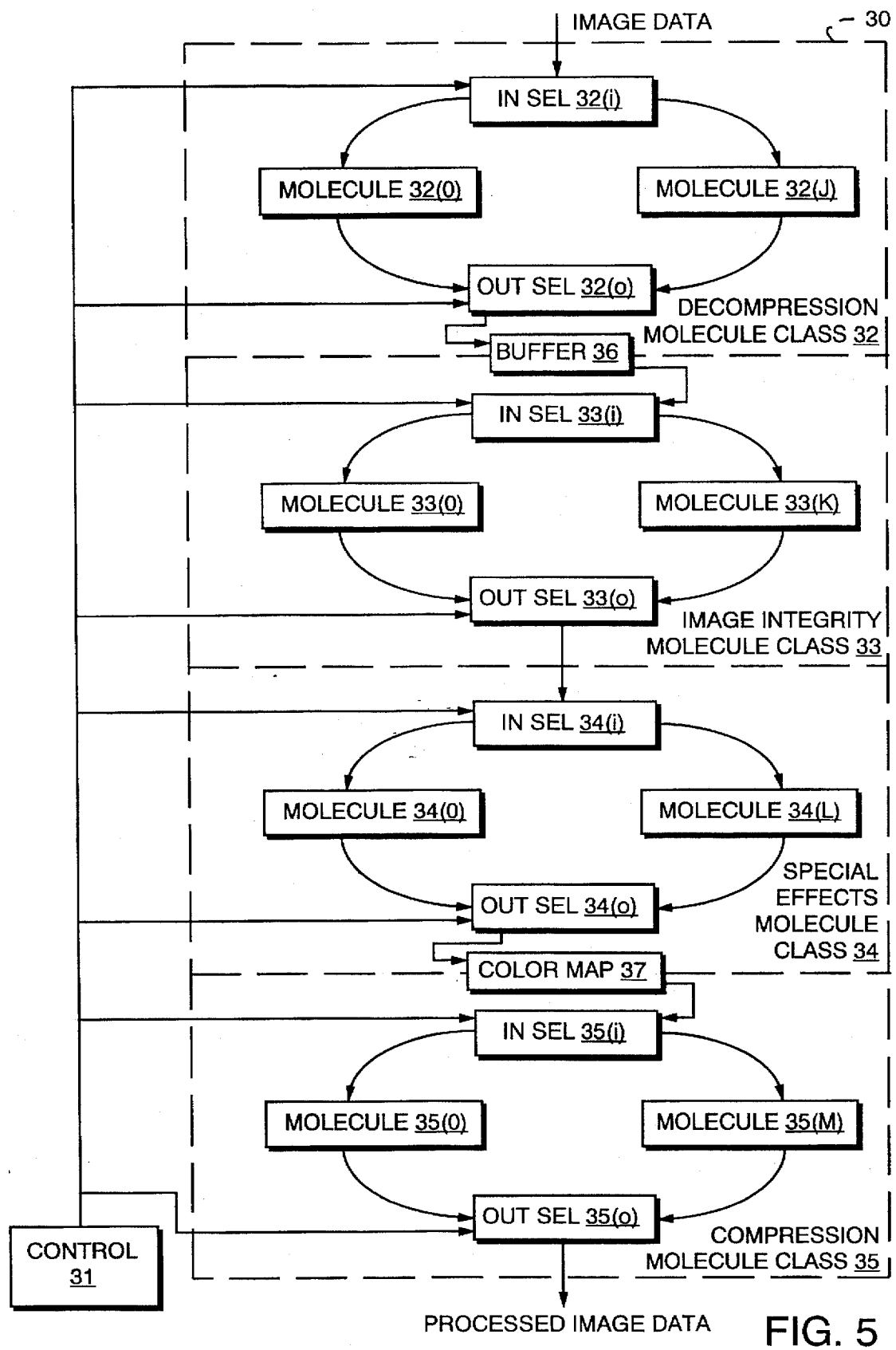
FIG. 5 is a functional block diagram illustrating the general structure of the image data processing section of the image processing system depicted in FIG. 2.

More specifically, and with reference to FIG. 5, the image data processing section 20 includes an image data processing library 30 and a image data processing control element 31. The image data processing control element 31 controls processing of the image data in response to the image processing operation selection information from the operator. The image data processing library 30 comprises a series of molecule classes, including an image data decompression molecule class 32, an image integrity molecule class 33, a special effects molecule class 34 and an image data compression molecule class 35 which are organized in a series or chain between the image data source 11 and downstream utilization element 12. The image data decompression molecule class 32, in turn, includes one or more image data decompression molecules 32(0) through 32(J) (generally identified by reference numeral 32(j)), each of which includes one or more atoms (described below in more detail in connection with FIG. 6), which, if enabled by the image data processing control element 31 in response to image processing operation selection information from the operator, performs a data decompression operation in connection with image data provided by the image data source 11. Similarly, the image integrity molecule class 33 includes one or more image integrity molecules 33(0) through 33(K) (generally identified by reference numeral 33(k)), each of which includes one or more atoms (described below in more detail in connection with FIG. 7). The atoms of each of the image integrity molecules 33(k) perform a number of operations, such as noise reduction, sharpening, burning and dodging, and the like, in connection with the image data, as enabled by the image data processing control element 31 in response to the image processing operation selection information from the operator.

In addition, the special effects molecule class 34 includes one or more special effects molecules 34(0) through 34(L) (generally identified by reference numeral 34(l), each of which also includes one or more atoms. Each of the special effects modules 34(l) performs one or more operations, such as image flipping, stretching and skewing, and in addition performs large kernel sharpening and color reassignment. These operations are also enabled by the image data processing control element 31 in response to the image processing operation selection information from the operator. Finally, the image data compression molecule class 35 includes one or more image data compression molecules 35(0) through 35(M) (generally identified by reference numeral 35(m)), each of which includes one or more atoms (described in more detail below in connection with FIG. 8) which if enabled by the image data processing control element 31 in response to the image processing operation selection information from the operator, performs a data decompression operation in connection with image data provided to the downstream utilization element 12.

In the embodiment depicted in FIG. 5, the image data processing library 30 also includes a buffer 36 for buffering decompressed image data as provided by the selected molecule 32(j) of the image data decompression molecule 32 prior to the decompressed image data being processed by the selected molecule 33(k) of the image integrity molecule class 33. Although only one buffer 36 is provided in the image data processing library 30 depicted in FIG. 5, it will be appreciated that other buffers may also be provided between other molecule classes. In addition, the image data processing library 30 includes a color map 37 for receiving data from the special effects molecule class 34 and for performing color mapping in connection with the data. That is, the color map 37 maps one or more of the colors represented by the data input thereto from the special effects colors, 34 to one or more other colors, thereby to alter the coloring of the image, with the mapping being controlled by the image processing control element 31.

As noted above, each of the molecule classes 32–35 in the image data processing library 30 includes one or more molecules, with one molecule in each molecule class being selected, in particular by the image data processing control element 31, during an image processing operation in response to the image processing operation selection information from the operator. Each molecule class is associated with a molecule input selector 32(i), 33(i), 34(i) and 35(i), respectively, which couples data that is input to the molecule class 32, 33, 34, 35 either from the image data source 11 or a preceding molecule class in the chain to one selected molecule 32($j_s$), 33($k_s$), 34($l_s$), 35($m_s$), in the molecule class, the one molecule being selected by the image data processing control element 31. In addition, each molecule class 32, 33, 34, 35 is associated with a molecule output selector 32(o), 33(o), 34(o), 35(o), which couples data that is output from the molecule class 32, 33, 34, 35 either to a succeeding molecule class in the chain or to the downstream utilization element 12 from the same selected molecule 32($j_s$), 33($k_s$), 34($l_s$), 35($m_s$), in the molecule class. The image data processing control element 31 uses the molecule input selector 32(i), 33(i), 34(i), 35(i) and molecule output selector 32(o), 33(o), 34(o), 35(o) of each molecule class 32, 33, 34, 35, to control selection of the particular molecule in the molecule class which is to perform processing during an image processing operation.

Figure 6:
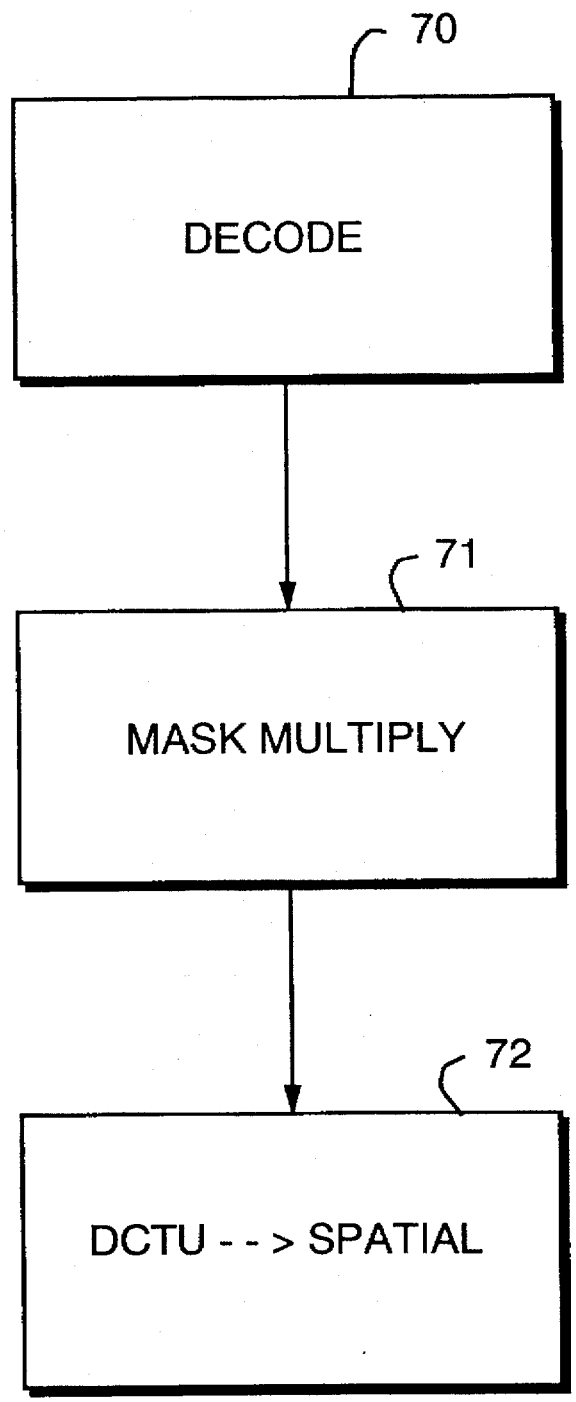
FIGS. 6 through 8 are detailed functional block diagrams illustrating details of portions of the image data processing section depicted in FIG. 5.
Figure 7:
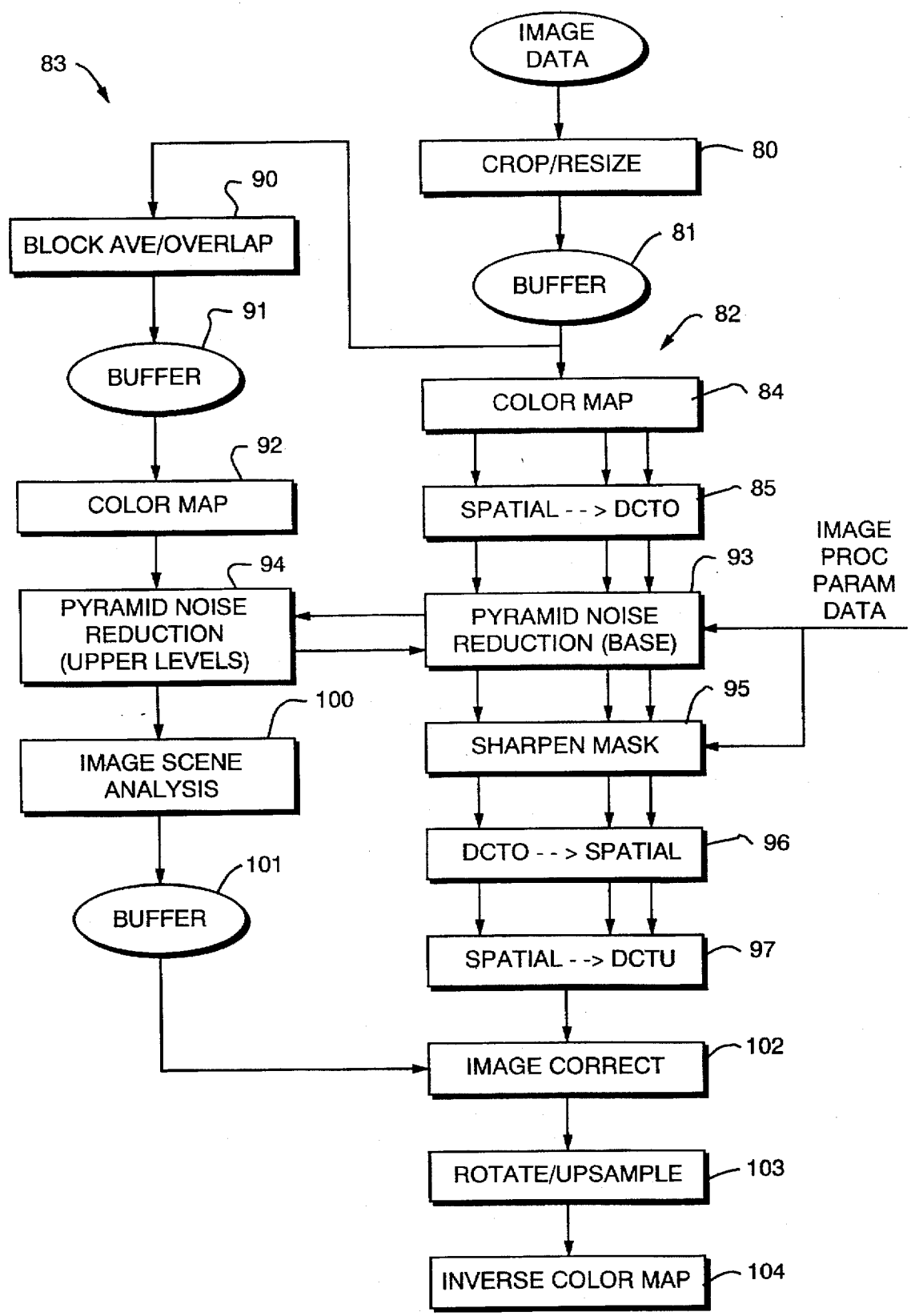
Figure 8:
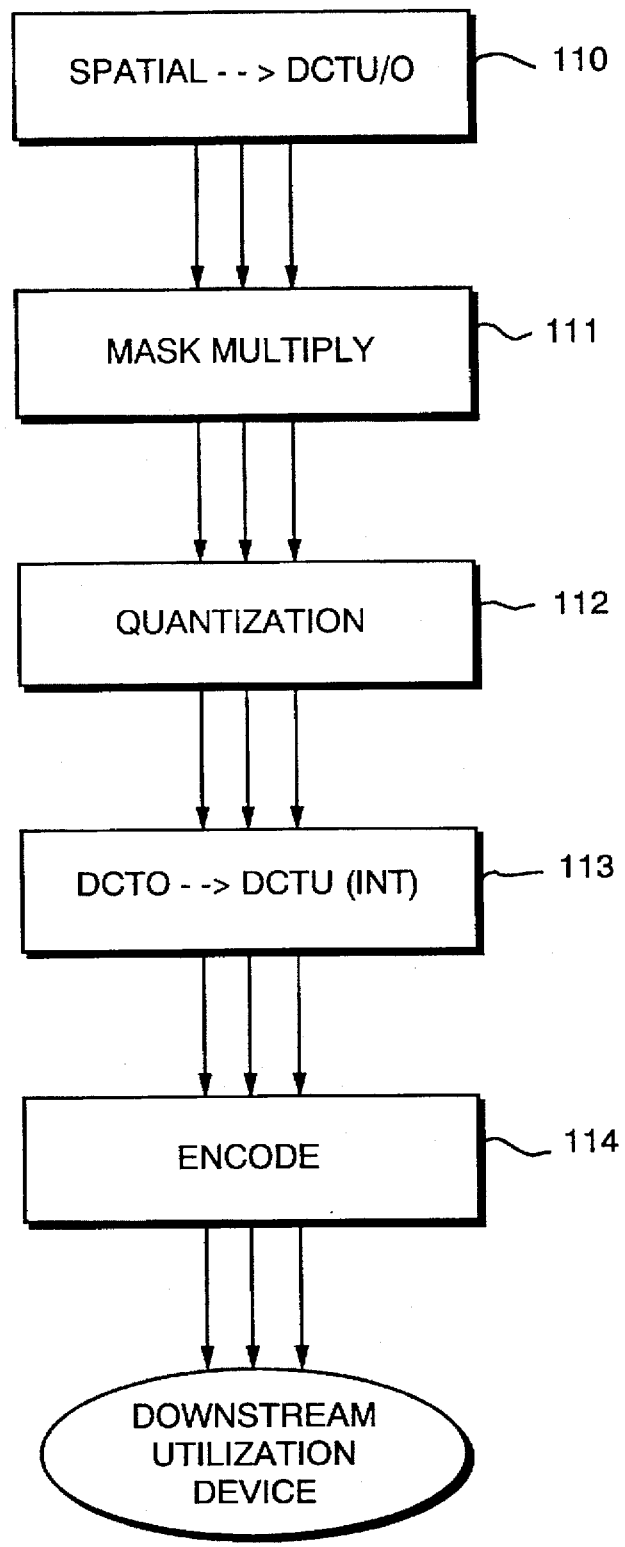

A specific example of the architectures of specific molecules in the various molecule classes 32–35 comprising the image data processing section 20 will be described in connection with FIGS. 6 through 8. FIG. 6 depicts a molecule 32(j) of the decompression molecule class 32, FIG. 7 depicts a molecule 33(k) of the image integrity molecule class 33, and FIG. 8 depicts a molecule (35(m)) of the compression molecule class 35. With reference initially to FIG. 6, and as described above in connection with FIG. 5, the decompression molecule class 32 includes a plurality of molecules 32(0) through 32(J), each of which performs a particular type of decompression operation in connection with the image data from, for example, the image data source 11. If the image data from the image data source 11 is in compressed form, based on a particular compression methodology, the operator, in the image processing operation selection information, may identify the particular decompression operation based on the compression methodology, and the image data processing control element 31 may control the selectors 32(i) and 32(o) based on that information to enable decompression based on the particular compression methodology. Alternatively, the compression methodology may be identified in another manner, such as by information contained in the image data itself, and the image data processing control element 31 may enable decompression automatically without information from the operator.

In one embodiment, illustrative molecules perform image data decompression based on the conventional JPEG (Joint Photographic Experts Group) standard JPEG DIS 10918 (molecule 32(0)), wavelet decompression (molecule 32(1)), and sub-band decompression (molecule 32(2)), although it will be recognized that other molecules 32(j) may also be provided to perform image data decompression in connection with other methodologies. The structure of one decompression molecule, namely, JPEG decompression molecule 32(0) is depicted in detail in FIG. 6. As shown in FIG. 6, molecule 32(0) includes three elements: a decode element 70, a mask multiply element 71, and an inverse DCT (discrete cosine transform) element 72. The molecule 32(0) is used in connection with compressed image data that is (i) in the form of DCT coefficients (that is, a DCT operation has been performed in connection with the pixel data defining the pixels comprising the image, and the image data that is provided to the JPEG compression molecule 32(0) comprises the DCT coefficients generated in response to the DCT operation) and (ii) is encoded using the well-known Huffman encoding method. As shown in FIG. 6, compressed image data may be provided separately for each of the primary colors with which the image is recorded. The decode element 70 decodes the Huffman-encoded DCT coefficients to generate the actual DCT coefficient values, and the mask multiply element 71 multiplies the DCT coefficients by the conventional JPEG quantization mask matrix. As is conventional, since the image is two-dimensional, the DCT coefficients defining the image as decoded by the decode element 70 are in the form of a two-dimensional matrix, and the mask matrix used by the mask multiply element 71 is also a two-dimensional matrix. The mask multiply element 71 multiplies correspondingly-positioned matrix elements of the DCT coefficient matrix and the JPEG quantization mask matrix in performing the mask multiply operation essentially to generate a masked DCT coefficient matrix. Finally, the inverse DCT element 72 performs an inverse discrete cosine transform operation in connection with the masked DCT coefficient matrix to generate spatial image data, that is, data defining pixel values for an image. It will be appreciated that the JPEG decompression molecule 32(0) does not operate in connection with values of parameters from the characteristic processing section, since the decompression operation will not result in transformations that affect image quality.

The detailed structure of other molecules 32(j), other than JPEG decompression molecule 32(0), in the decompression molecule class 32 will depend upon the particular series of operations required to perform decompression, which will be readily apparent to those skilled in the art.

FIG. 7 depicts the detailed structure of a molecules 33(k) of the image integrity molecule class 33. In one particular embodiment, the molecules 33(k) all include atoms for performing generally the same operations in the same order, but they will do them in diverse manners, so that some molecules 33(k) will perform the operations generally quickly but with somewhat reduced quality and other molecules 33(k) may perform the operations more slowly with enhanced quality. In addition, the particular ones of the available operations that are to be performed by the particular molecule 33(k) are specified by the image processing operation selection information from the operator; if the image processing operation selection information specifies that a particular operation is not to be performed, the atom or atoms relating to that operation will not be operative. Since the molecules 33(k) include atoms for performing generally the same operations, they are structured generally similarly, and so the general structure of only one molecule, namely, molecule 33(0), is shown in detail in FIG. 7.

As shown in FIG. 7, molecule 33(0) receives the decompressed image data from a decompression molecule 32(j) in the decompression molecule class 32. As indicated above, the decompressed image data as supplied by the decompression molecule class 32 is in spatial form, with the data defining pixel values for the image. A crop/resize element 80 is provided to enable the operator to crop or resize the image in response to the image processing operation selection information from the operator. The output of the crop/resize element 80 is buffered in a buffer 81. The output of buffer 81 is coupled to two processing channels, including a fine processing channel 82 and a coarse processing channel 83. The fine processing channel 82 processes the actual pixel data provided by the crop-resize element 80, while the coarse processing channel generates a series or hierarchy of images of varying degrees of coarseness. In generating the coarse image for each level in the hierarchy, the coarse processing channel 83 essentially forms each pixel in response to pixel values from blocks of selected numbers of pixels in the next lower level, with the coarse image for the lowest level in the hierarchy being generated from blocks of pixel data for pixels in the actual image (that is, the pixel data as provided by the buffer 81). Accordingly, the actual pixel data and the pixel data defining the successive ones of the series of coarse images in the hierarchy conceptually form a "pyramid," with images at progressively higher levels in the hierarchy having progressively fewer pixels.

In the fine processing channel 82, a color map element 84 receives the pixel data from the buffer 81. As indicated above, the pixel data essentially represents intensity level of the various colors, such as red, green and blue, comprising the image, and the color map element 84, if enabled by the image processing operation selection information, generates in response pixel data in luminance ("Y") and chrominance "u" and "v") form. The luminance and chrominance data is in spatial form, and an overlapped DCT element 85 is provided to perform a discrete cosine transform in connection with the luminance and chrominance data to generate an overlapped DCT coefficient matrix in connection with the luminance and chrominance information, if enabled by the operator.

In the coarse processing channel 83, a block average/ overlap element 90 generates the pixel data for the hierarchy of coarse images as described above, and provides it to a buffer 91. As with the pixel data in the fine processing channel 82 as described above, the pixel data for each of the coarse images represents the intensity level of various primary colors comprising the image, and a color map 92 is provided to convert the primary color pixel data to luminance and chrominance form, if enabled by the image processing operation selection information from the operator.

The overlapped DCT coefficient matrix from the overlapped DCT element 85 of the fine processing channel 82, and the luminance and chrominance data from the color map element 92 of the coarse processing channel 83, are provided to a noise reduction element jointly comprising a base noise reduction element 93 and an upper-level noise reduction element 94. If noise-reduction is enabled by the image processing operation selection information from the operator, the base noise reduction element 93 and upper-level noise reduction element 94 cooperate to perform a noise reduction operation in connection with the overlapped DCT coefficient matrix that the base noise reduction element 93 receives from the overlapped DCT element 85, and further in connection with image processing parameter data provided by the characteristic processing section 21, thereby to reduce noise in the image represented thereto.

In one particular embodiment, the noise reduction operations performed by the base noise reduction element 93 and upper-level noise reduction element 94 are generally as described in U.S. patent Appn. Ser. No. 08/440,639 allowed concurrently herewith, and will only generally be described herein. In that embodiment, the upper level noise reduction element 94 uses the upper levels of the hierarchy of coarse images to generate noise reduction information which is provided to the base level noise reduction element 93. In that operation, the upper level noise reduction element 94 generates a series of coarse images forming a hierarchy. To form each image in the hierarchy, the upper level noise reduction element 94 divides the pixels in the image in the next lower level into a set of blocks or "tiles," and a single pixel value is generated for the tile, which single pixel value is taken as the pixel value of a correspondingly-positioned pixel in the image at the next higher level of the hierarchy. The upper level noise reduction element generates the single pixel value as the DCT transform of the pixels in each tile is generated, and the value of the zero-th order DCT coefficient so generated is determined as the single pixel value.

After generating the various images in the hierarchy, the upper level noise reduction element 94, uses the values of noise reduction parameters, which form part of the image processing parameter data from the characteristic processing section, and the upper level image (that is, the coarsest image) in the hierarchy to generate a noise reduction mask that is used to correct the values of the DCT coefficients defining the upper level image. The upper level noise reduction element 94 propagates the corrected DCT coefficient values to the image at the next lower level in the hierarchy, and repeats the operation. After repeating the operations through the upper levels in the hierarchy, the upper level noise reduction element provides corrected DCT coefficient values to the base level noise reduction element, which performs similar operations in connection with the DCT coefficients for the actual image.

The noise-reduced overlapped DCT coefficient matrix generated by the base noise reduction element 93 is coupled to a sharpening element 95. If image sharpening is enabled by the image processing operation selection information from the operator, the sharpening element 95 performs an image sharpening operation in response to the noise-reduced overlapped DCT coefficient matrix and further in response to image processing parameter data from the characteristic processing section 21. As will be described in more detail below, in performing the image sharpening operation, the sharpening element 95 generates a sharpening mask matrix in response to the image processing parameter data, and then multiplies corresponding matrix elements of the sharpening mask and noise-reduced overlapped DCT coefficient matrix. An inverse DCT element 96 is provided to convert the overlapped DCT coefficient matrix to spatial pixel data values, which contain luminance and chrominance information for the noise-reduced and sharpened image, if enabled by the image processing operation selection information from the operator. In addition, a DCT element 97 is provided to perform a non-overlapped discrete cosine transform operation in connection with the pixel data values from inverse DCT element 96, if enabled by the image processing operation selection information from the operator.

Returning to the coarse processing channel 83, the upper-level noise reduction element 94 also generates an output which, if noise-reduction is enabled by the image processing operation selection information from the operator, represents noise-reduced pixel values for the images comprising the upper levels in the image hierarchy. In any case, the output of the upper-level noise reduction element 94 is coupled to an image scene analysis element 100. In response to image processing operation selection information from the operator enabling scene analysis, and identifying certain portions of the image containing image details which are to be enhanced or otherwise processed, the image scene analysis element 100 determines pixel value adjustments to accomplish the required alteration of the image in accordance with the information from the operator. The image scene analysis element 100 operates in a manner generally described in U.S. patent application Ser. No. 08/414,750 filed on Mar. 31, 1995 incorporated herein by reference, and will not be described herein in detail, and may also include a burning-and-dodging element. The pixel value adjustments from the image scene analysis element 100 are coupled to a buffer 101 for intermediate storage. It will be appreciated that, if the operator has not, in the image processing operation selection information, enabled the image scene analysis/burning and dodging element 100, buffer 101 would be empty.

The output from the non-overlapped DCT element 97 and pixel value adjustment values buffered in buffer 101, if any, are coupled to an image correction element 102. If the operator enables image scene analysis/burning and dodgi non-overlapped DCT element 97 is disabled, in which case the values passed to the image correction element 102 by the element 97 are the spatial pixel values from the inverse DCT element 96. In that case, the image correction element 102 produces corrected image pixel values in response to the spatial pixel values and the pixel value adjustment values from buffer 101. The adjusted pixel values generated by the image correction element 102 are coupled to a rotate/upsample element 103, which, if enabled by the image processing operation selection information from the operator, processes the adjusted pixel values to effect a rotation of the image through an angle specified by the image processing operation selection information from the operator. Finally, the rotated adjusted coefficient matrix generated by the rotate/upsample element 103 is coupled to an inverse color map element which, if color mapping is enabled by the image processing operation selection information from the operator as described above in connection with elements 84 and 92, converts the luminance and chrominance pixel information to selected color pixel information as the output of the molecule 33(0). It will be appreciated that, if the operator has, through the image processing operation selection information, enabled the non-overlapped DCT element 97, the elements 102 through 104 would be disabled, in which case the non-overlapped DCT coefficient values would be provided as the output of the molecule 33(0).

It will be appreciated that the particular order in which the image data processing section 20 initiates the operations that are to be performed by the enabled atoms in the molecule 33(0) may differ from that described above. In particular, the operations of the coarse processing chain 83 may be performed prior to the performance of any of the operations of the fine processing chain 82, since the processing in connection with the coarse processing chain 83 produces global adjustments which will be used in connection with the fine processing chain 82. In any case, if noise-reduction is enabled, the upper-level noise reduction element 94 will perform its operations prior to noise reduction by the base noise reduction element 93, since the base noise reduction information uses noise reduction information generated by the upper-level noise reduction element 94. In addition, the image scene analysis/burning and dodging element 100, if enabled, will perform its operations prior to the image correction element 102, since the operations performed by the image correction element 102 will use information generated by the image scene analysis/burning and dodging element 100.

In one embodiment, the color mapping described above in connection with the color mapping elements 84 and 92 is performed by means of a look-up table (not separately shown) which maps the RGB pixel color values to "L" luminance and "u, v" chrominance values, and vice-versa for the inverse color mapping element 104. The look-up tables that are used in the color mapping and inverse color mapping elements 84, 92 and 104 for particular image data reflect the particular type of image acquisition device 4 or image data generation arrangement 13 which generated the image data and the particular downstream utilization element 12 to utilize the image data. The values used in the look-up tables are generated to map one color space into another, preferably using device-independent color spaces as intermediaries.

It will be appreciated that, while the color mapping and inverse color mapping affect the quality of an image as seen by an observer, in one embodiment these characteristics will not be processed by the characteristic processing section 21 since they do not affect the spatial processing of the image data.

Each of the diverse molecules 34($l$) comprising the special effect molecule class 34 comprises one or more atoms that jointly perform one type of special effects operation in connection with the image data, such as image annotation, color mapping to a palette, and so forth, as enabled by the image processing operation selection information from the operator. It will be appreciated that the structure and operation of each molecule 34($l$) will depend on the particular type of special effects operations to be performed, but the general structures of the molecules 34($l$) will be apparent from the above description and will not be further presented herein.

FIG. 8 depicts molecules 35($m$) of the compression molecule class 35. As shown in FIG. 8, and as described above in connection with FIG. 5, the compression molecule class 35 includes a plurality of molecules 35(0) through 35(M), each of which performs a particular type of compression operation in connection with the data it receives from the special effects molecule class 34, and compresses it prior to transferring it to the downstream utilization element 12, if enabled in response to the image processing operation selection information from the operator. Each of the molecules 35($m$) performs compression in connection with a selected compression methodology, and if the operator, in the image processing operation selection information, identifies the particular compression methodology, the image data processing control element 31 controls the selectors 35($i$) and 35($o$) based on that information to enable compression based on the selected compression methodology. Alternatively, the compression methodology may be identified in another manner, and the image data processing control element 31 may enable compression automatically without information from the operator.

In the one embodiment described above in connection with FIG. 5, illustrative molecules 35(m) perform image data compression based on the same methodologies as used by the molecules 32(j) in performing image data decompression. In particular, molecules may be provided to perform data compression based on the conventional JPEG (Joint Photographic Experts Group) standard JPEG DIS 10918 (molecule 35(0)), noted above, wavelet compression (molecule 35(1)), and sub-band compression (molecule 35(2)), although it will be recognized that other molecules 35(m) may also be provided to perform compression in connection with other methodologies. The structure of one compression molecule, namely, JPEG compression molecule 35(0) is depicted in detail in FIG. 8. As shown in FIG. 8, molecule 35(0), includes five elements, including a DCT element 110, a mask multiply element 111, a quantization element 112, a DCT conversion element 113, and an encode element 114. If the output of the special effects molecule class 34 comprises image pixel data, image processing operation selection information from the operator will enable the DCT element 110 to perform a two-dimensional discrete cosine transform operation in connection therewith, in either overlapped or non-overlapped form to generate a DCT coefficient matrix. The elements 111, 112 and 114 of the molecule 35(0) will be jointly enabled or disabled in response to the image processing operation selection information from the operator, and DCT conversion element 113 will be selectively enabled or disabled depending on whether DCT element 110 generated the DCT coefficient matrix in overlapped form or non-overlapped form. If the elements 111, 112 and 114 are enabled, mask multiply element 111 performs a mask multiply operation in connection with the DCT coefficient matrix from DCT element 110 using a mask matrix essentially to provide a masking operation inverse or complementary to that performed by the element 71 (FIG. 6). The quantization element 112 performs a quantization operation, as described below, to quantize the elements of the DCT coefficient matrix in connection with a quantization parameter provided thereto by the characteristic processing section 21 in the image processing parameter data. If the DCT element 110 used an overlapped discrete cosine transform DCT coefficient DCT coefficient matrix, the DCT conversion element 113 is enabled to convert the quantized overlapped DCT coefficient matrix to non-overlapped form, retaining only the integer portions of the matrix element values. Finally, the encode element 114 encodes the matrix elements output by the DCT conversion element 113 conveniently using, for example, the above-described Huffman encoding methodology.

As noted above, image processing parameter data provided by the characteristic processing section is used in three particular elements of the illustrative molecules 33(0) and 35(0), namely, the atoms 93 and 94 for performing noise reduction, the sharpening atom 95, and the quantization atom 112. It will be appreciated that these atoms perform processing in connection with the data input thereto in such a manner as to modify the appearance of the image defined by the image data, in such a way that relates to characteristics of the image data source 11 and downstream utilization element 12 and so these atoms operate in relation to image processing parameter information provided by the characteristic processing section 21.

B. Detailed Description of Characteristic Processing Section 21

As described above, the characteristic processing section 21 generates the image processing parameter data to be used by the image data processing section 20 in processing the image data in relation to the specific device or methodology used to acquire the image data, and the specific device or methodology to be used, for example, in rendering the image after the image processing system 10 provides the processed image data to the downstream utilization element 12. In one embodiment, the characteristic processing section 21 generates the image processing parameter information in response to image source and downstream utilization element characteristic data comprising a "modulation transfer function" and a "Wiener noise spectrum" function. The modulation transfer function and the Wiener noise spectrum for an optical system define the image data modulation and spatial filtering performed by the system in generating its output in response to its input, and image noise generated by the system in generating the output. Generally, the modulation transfer functions, identified here as "$MTF_I(f)$" for the image source characteristic data, and $MTF_O(f)$ for the downstream utilization element characteristic data, identify how the image data source 11 and downstream utilization element 12, respectively, modulate the appearance of the image during, for example, image acquisition in the case of the image data source, and rendering in the case of the downstream utilization element. In general, for a monochrome optical system, if the spatial distributions of the input to and output from the optical system are given by $I_i(x,y)$ and $I_o(x,y)$, respectively, where "x" and "y" represent the conventional coordinate axes, the optical transfer function $\mathscr{H}(\omega_x, \omega_y)$ corresponds to the ratio of the two dimensional Fourier transform $\mathscr{I}_o(\omega_x, \omega_y)$ of the spatial output distribution $I_o(x,y)$ to the two dimensional Fourier transform $\mathscr{I}_i(\omega_x, \omega_y)$ of the input spatial distribution $I_i(x,y)$ [otherwise stated, the optical transfer function is defined as $\mathscr{I}_o(\omega_x, \omega_y) = \mathscr{H}(\omega_x, \omega_y) * \mathscr{I}_i(\omega_x, \omega_y)$, where "*" refers to the multiplication operation], and the modulation transfer function MTF(f) of the optical system is the absolute value of the optical transfer function $|\mathscr{H}(\omega_x, \omega_y)|$. For a multi-color imaging system, modulation transfer functions MTF(f) are determined separately for each color. The Wiener spectrum characterizes the noise in the image, including that noise introduced with the original data provided by image data source 11, noise added or removed in successive processing operations in image data processing section 20, and noise introduced during rendering by the downstream utilization element. The Wiener spectrum is most easily evaluated by observing the data fluctuations in the rendered image in the case that a uniform source image is presented to the system.

As noted above, the modulation transfer function and the Wiener noise spectrum for an imaging system together define the spatial filtering performed by the system in generating its output in response to its input, and the noise produced by the system in generating the output. Accordingly, the modulation transfer function and Wiener noise spectrum for a specific image data source 11 essentially define spatial "processing" performed by the image data source 11 in acquiring or generating the image data from, for example, a source image or a physical object, and the modulation transfer function and Wiener noise spectrum for a specific downstream utilization element 12 essentially define the "processing" performed by the downstream utilization element in rendering an image. If different optical systems, or different types of optical systems, "process"

their inputs differently, they will have different modulation transfer functions and Wiener noise spectra. In generating the image processing parameter information, the characteristic processing section 21 essentially performs the processing operations, in the same order, as called for in the image processing operation selection information provided by the operator in connection with the specific modulation transfer functions and Wiener noise spectra of the specific image data source 11 that provided the image data and downstream utilization element 12 that is to use the processed image data, thereby to optimize the processing of the image data by the image data processing section 20 for that source 11 and downstream utilization element 12.

With this background, as shown in FIG. 2, the characteristic processing section 21 includes an image processing profile generator 21A, an image quality value generator 21B and a parameter optimizer 21C, all controlled by a controller 21D to generate a set of optimum values for parameters to be used by the image data processing section 20. These elements will be described in detail in connection with FIG. 9. Generally, the controller 21D, in response to the image processing operation selection information from the operator, establishes the image processing profile generator 21A as chains of characteristic processing atoms which process the image source and downstream utilization element characteristic data from the image data source 11 and downstream utilization element 12, respectively. It will be appreciated that the particular characteristic processing atoms that will be accessible to the controller 21D in any particular embodiment of image processing system 10 will be those that depend on the parameters that may be used by the collection of atoms in the molecules and molecule classes comprising the image data processing library 30; a specific example of characteristic processing atoms that will be used in connection with the particular image processing atoms described above in connection with FIGS. 6 through 8 will be described below in connection with FIG. 9. The controller 21D will select particular ones of the characteristic processing atoms link them to form the image processing profile generator 21A comprising one or more characteristic processing chains (step 111, FIG. 4 above) as specified in the image processing operation selection information, and use them to generate the image processing parameter data.

Figure 9:
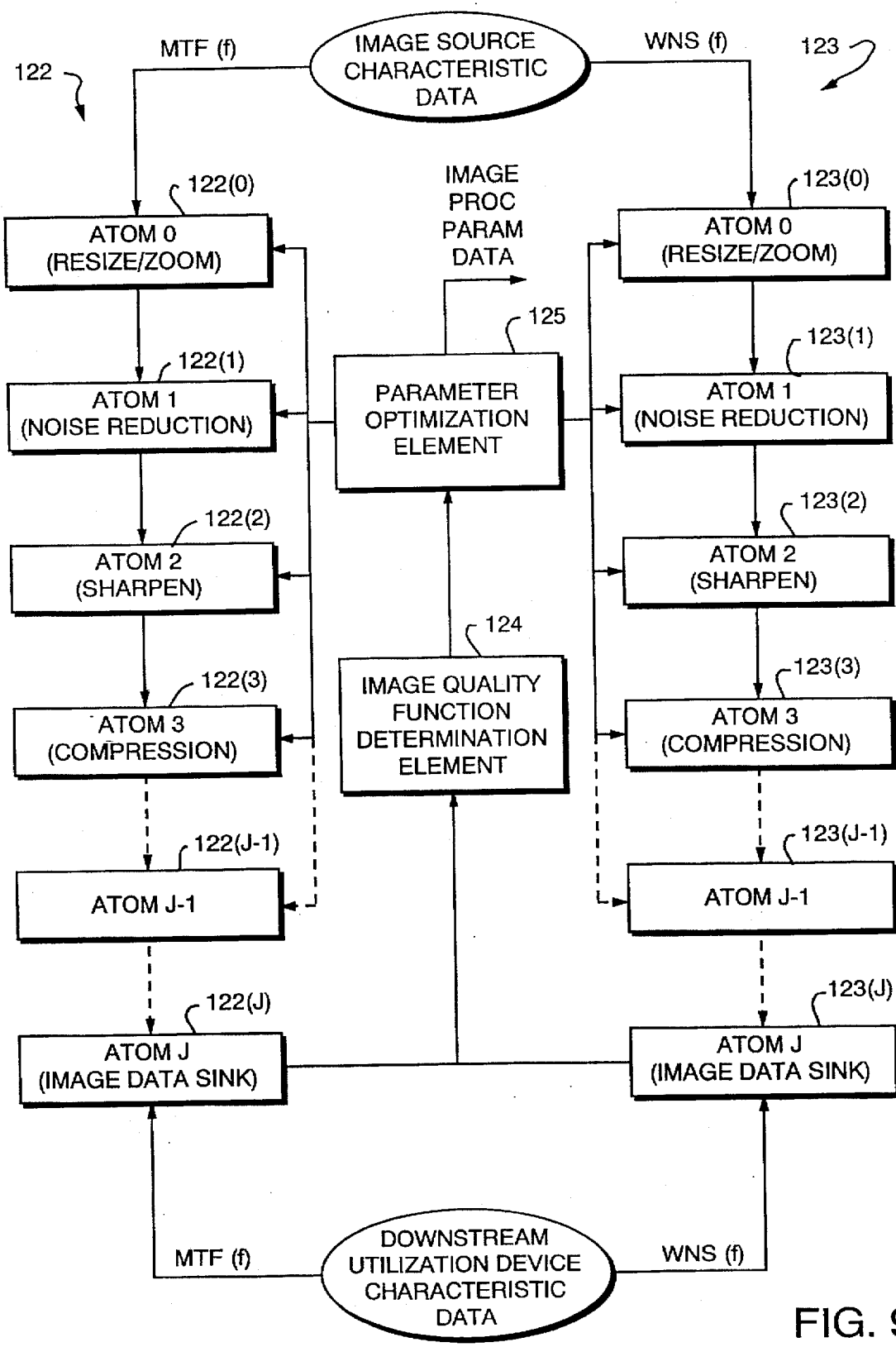
FIG. 9 is a detailed block diagram illustrating the characteristic processing section of the image processing system depicted in FIG. 2.

A specific illustrative characteristic processing chain is shown in FIG. 9. As noted above, in one embodiment the image source and downstream utilization element characteristic data comprises modulation transfer function information and Wiener noise spectrum information, and in that embodiment the characteristic processing controller 21D actually establishes the image processing profile generator as two characteristic processing chains, one, identified by reference numeral 122, for processing the modulation transfer function information and the other, identified by reference numeral 123, for processing the Wiener noise spectrum information. The sequence of atoms in each of the chains 122 and 123 corresponds to the sequence of the atoms that perform spatial processing of image data in the selected molecules 32–35 in the image data processing library 30 that are enabled by the image processing operation selection information from the operator. Thus, if the molecules 32(0) (FIG. 5) 33(0) (FIG. 6), and 35(0) (FIG. 7), as described above, are selected, and if all of the atoms which perform spatial processing in connection with the image data are enabled, the characteristic processing controller 21D will establish the chains 122 and 123 as shown in FIG. 9.

Accordingly, with reference to FIG. 9, the modulation transfer function processing chain 122 includes a series of characteristic processing atoms 122(0) through 122(J) (generally identified by reference numeral 122(j)), including an atom 122(0) for performing an image resize/zoom operation, an atom 122(1) for performing a noise reduction operation, an atom 122(2) for performing a sharpening operation, an atom 122(3) for performing a compression operation, and an atom 122(J) for performing a processing operation corresponding to the processing performed by the particular downstream utilization element 12 in, for example, rendering the image. Specific operations performed by the atoms 122(1) through 122(J) in connection with one embodiment will be described below. It will be appreciated that the order of atoms 122(0), 122(1), 122(2), and 122(3) in the chain 122 corresponds to the order that image resizing/zoom, noise reduction, sharpening and compression would be performed by the image data processing section in the molecules 32(0), 33(0), and 35(0) as described above. In addition, the atom 122(J), relating to the downstream utilization element 12, is positioned last since the downstream utilization element 12 is clearly the last processing performed in connection with image data prior to it being, for example, rendered. Additional atoms, represented by atom 122(J–1) are depicted to represent the possibility that, for example, parameters may be required by selected special effects molecules 34(1) in the special effects molecule class 34, or other atoms which may be provided in molecules 32(0), 33(0) and 34(0) that are not shown in FIGS. 6 through 8.

The Wiener noise spectrum processing chain 123 includes atoms 123(0) through 123(J) for performing corresponding image resize/zoom, noise reduction, sharpening, compression, and so forth, operations in connection with the Wiener noise spectrum information. Although the atoms 123(0) through 123(J) in the Wiener noise spectrum processing chain 123 perform operations corresponding to those performed by the atoms 122(0) through 122(J) in the modulation transfer function processing chain 122, the specific operations performed by the atoms 123(0) through 123(J) need not be the same as the specific operations performed by the atoms 122(0) through 122(J). A specific illustration of operations performed by atoms 123(0) through 123(J) of the Wiener noise spectrum processing chain will also be described below.

The characteristic processing section 21 further includes an image quality function value determination element 124 and a parameter optimization element 125, both of which are depicted on FIG. 9, and which correspond to the image quality value generator 21B and a parameter optimizer 21C (FIG. 2), respectively. As described above, the characteristic processing section 21 processes the modulation transfer function and Wiener noise spectrum information related to the specific image data source 11 and downstream utilization element 12 which, for example, acquire and render the image, to generate the image processing parameter data to be used by the image data processing section 20. In doing so, the atoms 122(j) comprising the modulation transfer function chain 122 and the atoms 123(j) comprising the Wiener noise spectrum chain 123 generally process the modulation transfer function and Wiener noise spectrum information using parameters provided by the parameter optimization element 125 to generate information which is used by the image quality function value determination element 124 to generate a single image quality function value that is representative of the quality of the image to be, for example, rendered by the downstream utilization element 12. The parameter optimization element 125 receives the image quality function value and, using the values of the various parameters as were provided to the modulation transfer function chain 122 and the Wiener noise spectrum chain 123, generates updated parameter values. The modulation transfer function chain 122 and Wiener noise spectrum chain 123 repeat their operations using the updated parameter values to generate updated information to be provided to the image quality function determination element 124. In response to the updated information from the modulation transfer function chain 122 and Wiener noise spectrum chain 123, the image quality function determination element 124 generates an updated image quality function value to be used by the parameter optimization element 125 in generating yet another set of parameter values which may be provided to the chains 122 and 123. These operations are repeated through a series of iterations until the parameter optimization element 125 determines that the parameter values that it generates during an iteration meet a predetermined iteration termination criterion, in which case the iterations are stopped and the parameter optimization element provides the values of the parameters so determined to the image data processing section 20 as the image processing parameter data. In one embodiment, the initial set of parameter values provided by the parameter optimization element 125 to the modulation transfer function chain 122 and Wiener noise spectrum chain 123 are generated as random values, and the optimization element determines whether the termination criterion has been met by determining whether the parameter values generated during a given iteration are within a selected tolerance range of the values of corresponding parameters used during a previous iteration.

The specific operations performed by the atoms 122(j) and 123(j) comprising the chains 122 and 123 in connection with the modulation transfer function, the Wiener noise spectrum and the values of the parameters provided by the parameter optimization element 125 will, as indicated above, be determined generally by the operations performed by the corresponding atoms of the selected molecules 32(j), 33(k), 34(l) and 35(m) in the image data processing section 20. The modulation transfer function and Wiener noise spectrum provided to the chains 122 and 123 are effectively in DCT coefficient value form, effectively comprising matrices of values for the various frequencies $f_i$ used in generating the modulation transfer function and Wiener noise spectrum; thus, the modulation transfer function matrix is represented herein by "$M(f_i)$" and following established practice the one dimensional slice through the two dimensional Wiener spectrum matrix $W(f_i,0)$ is represented as $W(f_i)$.

The image resize/zoom atoms 122(0) and 123(0) generate zoomed modulation transfer function and Wiener noise spectrum values, respectively, representing the modulation transfer function and Wiener noise spectrum of a resized or zoomed image in response to a zoom factor "Z," and the input modulation transfer function $M(f_i)$ and Wiener noise spectrum $W(f_i)$ provided to the characteristic processing section 21, as $$M_Z(f_i) = M(f_i * Z) \quad (1)$$

$$W_Z(f_i) = W(f_i * Z) * Z^2 \quad (2)$$

for each frequency component $f_i$. The value of the zoom factor "Z" may be provided by the operator as part of the image processing operation selection information, or it may in addition be a function of the sizes of the pixels (picture elements) of the image data source and the downstream utilization element.

The noise reduction atoms 122(1) and 123(1) generate noise-reduced modulation transfer function and Wiener noise spectrum values $M'(f_i)$ and $W'(f_i)$ in response to the zoomed modulation transfer function $M_Z(f_i)$ and Wiener noise spectrum $W_Z(f_i)$ provided thereto as follows:

$$M'(f_i) = N_M(\alpha, \beta, M(f_i), W(f_i)) * M_Z \quad (3)$$

and $$W'(f_i) = N_W(\alpha, \beta) * W_Z(f_i) \quad (4)$$

where $N_M(\alpha, \beta, M(f_i), W(f_i))$ is a function of parameters $\alpha$ and $\beta$, as well as the modulation transfer function $M(f_i)$ and Wiener noise spectrum $W(f_i)$ as provided to noise reduction atom 123(1) of the modulation transfer function processing chain 122, and $N_W(\alpha, \beta)$ is a function of parameters $\alpha$ and $\beta$ as well as the Wiener noise spectrum $W(f_i)$ as provided to the noise reduction atom 123(1) of the Wiener noise spectrum processing chain 123. The parameters $\alpha$ and $\beta$, in one embodiment, are discussed below.

In one embodiment, the noise reduction atom 123(1) of the Wiener noise spectrum processing chain 123 is modeled as a generalized Wiener noise filter. Generally, a signal $C(f_i)$ input to a Wiener noise filter includes both desired signal components $S(f_i)$ and noise components $N(f_i)$, or $C(f_i) = S(f_i) + N(f_i)$. A generalized Wiener noise filter generates an output $C'(f_i)$ for each frequency $f_i$ according to $$C'(f_i) = \left( \frac{1}{1 + \alpha \frac{W(f_i)}{C^2(f_i)}} \right)^\beta C(f_i) \quad (5)$$

For a uniform image, the desired signal component of the input signal has a zero value, and so the entire input signal is represented by the noise component, that is, $C(f_i) = N(f_i)$. Accordingly, from equation (5), $$W'(f_i) = \epsilon \left[ \left[ \left[ \frac{1}{1 + \alpha \frac{W(f_i)}{N^2(f_i)}} \right]^\beta N(f_i) \right]^2 \right] \quad (6)$$

(where "$\epsilon$" refers to the expectation value function) since the noise, represented by $N(f_i)$ is presumed to be random. To generate the noise-reduced Wiener noise spectrum $W'(f_i)$, the expectation value is generated by generating a Wiener noise spectrum noise reduction factor "$nrf_W(\alpha, \beta)$" based on equation (6), by using a new randomly-distributed variable $\epsilon =$, $$\frac{N(f_i)}{\sqrt{W(f_i)}},$$

which has a mean value of zero and a variance of one. In that case, the Wiener noise spectrum noise reduction factor corresponds to $$nrf_W(\alpha, \beta) = \epsilon \left[ \left( \left( \frac{1}{1 + \frac{\alpha}{2\xi^2}} \right)^\beta \xi \right)^2 \right] \quad (7)$$

accordingly, for discrete values of $\epsilon$, $$nrf_W(f_i) = \frac{2\delta\xi}{\sqrt{\pi}} \sum_{j=0}^{\infty} \left( 2e^{-\xi_j^2} \left( \frac{1}{1 + \frac{\alpha}{2\xi_j^2}} \right)^\beta \xi_j^2 \right) \quad (8)$$

where $\epsilon_j = j\delta\epsilon$, where $\delta\epsilon$ is the sampling interval. In one embodiment, at high levels of noise reduction the actual amount of residual noise that is observed is somewhat higher than that which would be present if the noise reduction factor $nrf_W(f_i)$ from equation (8) were used directly as the $N_W(\alpha,\beta, W(f_i))$ in equation (4) directly; to accommodate the difference the noise-reduced Wiener noise spectrum is modeled as $$W'(f_i) = [0.996 * nrf_W(\alpha,\beta) + 0.011e^{-12.2 * nrf^{W(\alpha,\beta)}}]W(f_i) \quad (9)$$

so that $N_W(\alpha,\beta)$ in equation (4) corresponds to $$N_W(\alpha,\beta, W(f_i)) = 0.996 * nrf_W(\alpha,\beta) + 0.011 * e^{-12.2 nrf^{W(\alpha,\beta)}}$$

It will be appreciated that, at high levels of noise reduction, where $nrf_W(\alpha,\beta)$ is relatively low, the value of $N_W(\alpha,\beta)$ approaches the value "0.011," whereas as the value of the noise reduction factor increases, the value of $N_W(\alpha,\beta)$ approaches $0.996 * nrf_W(\alpha,\beta)$.

In determining the expression for $N_M(\alpha,\beta, M(f_i), W(f_i))$ for calculating the noise-reduced modulation transfer function $M'(f_i)$ in equation (3), the modulation transfer function can be determined from the expected value of the ratio of the expectation value of the noise-reduced signal amplitude $C'(f_i)$ as processed by the noise reduction atom 122(1) to the expectation value of the input signal amplitude $c(f_i)$, or $$N_M(\alpha,\beta,M(f_i),W(f_i)) = \frac{\epsilon[C'(f_i)]}{\epsilon[C(f_i)]} \quad (10)$$

for each frequency $f_i$. Generally, the average spectral signal amplitude distribution for real-world images $S_w(f_i)$ corresponds to $\epsilon[S_w(f_i)] = S_0/f_i$, where $S_0$ is related to the variance of the signal amplitude over the image. From the definition of the modulation transfer function for an image acquisition system as described above, the expectation value $\epsilon[S_i(f_i)]$ for the signal amplitude of an image as acquired by the image acquisition system corresponds to $$\epsilon[S_i(f_i)] = \frac{M(f_i)S_0}{f_i} \quad (11)$$

If both the signal and the noise are independent random variables with mean values of zero, then the sum $C(f_i)$ is also random with a zero mean value and a variance $$\sigma^2 = \left[\frac{M(f_i)S_0}{f_i}\right]^2 + W(f_i),$$

and has a probability distribution function of $$p(C(f_i)) = \quad (12)$$

$$\frac{1}{\sqrt{2\pi}\left[\left(\frac{M(f_i)S_0}{f_i}\right)^2 + W(f_i)\right]^{1/2}} \times e^{-\left(\frac{[C(f_i)]^2}{2\left[\left(\frac{M(f_i)S_0}{f_i}\right)^2 + W(f_i)\right]}\right)}$$

If in equation (12), a substitution is made in which the exponent $$\frac{[C(f_i)]}{\sqrt{2}\left[\left(\frac{M(f_i)S_0}{f_i}\right)^2 + W(f_i)\right]^{1/2}}$$

is replaced by the variable "$\lambda$", then equation (5) and equation (10) combine to form $$N_M(\alpha,\beta,M(f_i),W(f_i)) = \quad (13)$$

$$\frac{\epsilon\left[\left(\frac{\lambda^2}{\lambda^2 + \frac{\alpha W(f_i)}{2\left[\left(\frac{M(f_i)S_0}{f_i}\right)^2 + W(f_i)\right]}}\right)^\beta \lambda\right]}{\epsilon[\lambda]}$$

or $$N_M(\alpha,\beta,M(f_i),W(f_i)) = \quad (14)$$

$$\frac{\sum_{j=0}^{\infty} e^{-\lambda_j^2}\left[\frac{\lambda_j^2}{\lambda_j^2 + \frac{\alpha}{2\left[\left(\frac{M(f_i)S_0}{f_i}\right)^2 + W(f_i)\right]}}\right]^\beta \lambda_j}{\sum_{j=0}^{\infty} e^{-\lambda_j^2}\lambda_j}$$

where $\lambda_j = j * \delta\lambda$. The noise reduction atom 122(1) uses the values for $N_M(\alpha,\beta, M(f_i), W(f_i))$ for each frequency $f_i$ along with equation (10) in generating the noise-reduced modulation transfer function $M(f_i)$.

The sharpening atoms 122(2) and 123(2) perform sharpening in connection with the values of the various values of noise-reduced modulation transfer function matrix $M'(f_i)$ and noise-reduced Wiener noise spectrum matrix $W'(f_i)$ provided thereto using a sharpening matrix $K(f_i)$ as follows:

$$M''(f_i) = K(f_i)M'(f_i) \quad (15)$$

for the sharpening atom 122(2) of the modulation transfer function chain 122, and $$W''(f_i) = [K(f_i)]^2 W'(f_i) \quad (16)$$

for the sharpening atom 123(2) of the Wiener noise spectrum chain 123. In one embodiment, the elements of the sharpening matrix $K(f_i)$ are determined according to:

$$K(f_i) = \gamma\left[\frac{1 - \sin(\pi\Delta\delta f_i)}{\pi\Delta\delta f_i}\right] + 1 \quad (17)$$

with $\gamma$ and $\Delta$ being parameters and $\delta$ representing the width of a pixel. It will be apparent from both equations (15) and (16) that, in performing the multiplications of the sharpening matrix $K(f_i)$ with the noise-reduced modulation transfer function matrix $M'(f_i)$ and the noise-reduced Wiener noise spectrum matrix $W'(f_i)$, corresponding elements of the respective matrices are multiplied. It will be appreciated that the sharpening matrix $K(f_i)$ in equation (17) will generally serve to increase the values of the matrix elements of matrices $M'(f_i)$ and $W'(f_i)$ relating to the higher-frequency modulation transfer function and Wiener noise spectrum components, with the degree of increase being a somewhat complex function of the parameters $\gamma$ and $\Delta$. The sharpening atom 122(2) of the modulation transfer function chain 122 generates a matrix $M''(f_i)$ in accordance with equations (15) and (17), and sharpening atom 123(2) of the Wiener noise spectrum chain 123 generates a matrix $W''(f_i)$ in accordance with equations (16) and (17), which the atoms provide to respective compression atoms 122(3) and 123(3).

As described above in connection with FIG. 8, the JPEG compression molecule 35(m) effectively performs compression using both quantization and Huffman encoding. Since Huffman encoding effectively results in no loss of image information, but quantization can result in loss of image information, the compression atoms 122(3) and 123(3)

perform processing only in connection with the quantization portion of compression, effectively generating quantized modulation transfer function and Wiener noise spectrum values as follows:

$$M(f_i)_q = L_m(f_i, \Delta_q(f_i)) M''(f_i) \quad (18)$$

$$W(f_i)_q = L_w(f_i, \Delta_q(f_i)) W''(f_i) \quad (19)$$

where $L_M(f_i, \Delta_q(f_i))$ and $L_w(f_i, \Delta_q(f_i))$, which are functions of both frequency $f_i$ scaled quantization interval $\Delta_q(f_i)$ as described below, represent quantization factors used by the compression atoms 122(3) and 123(3) in quantizing the noise-reduced sharpened modulation transfer function value $M''(f_i)$ and Wiener noise spectrum value $W''(f_i)$, respectively. In performing compression in relation to the JPEG standard, the compression atoms 122(3) and 123(3) use a scaled quantization mask $Q(f_i)$ that defines the intervals between quantized values for each of the different frequencies $f_i$, and that is derived from a contrast sensitivity function that describes sensitivity of the eye to detail. The compression atoms 122(3) and 123(3) scale the quantization intervals in relation to a scaling factor. Thus, for any particular frequency $f_i$, the scaled quantization interval is given by:

$$\Delta_q(f_i) = S * Q(f_i) \quad (20)$$

where "S" is the quantization scaling factor, and is one of the parameters provided by the characteristic processing section 21.

The variance of $X_q$ is determined to be related to the variance of x by:

$$\sigma_q^2 = \sigma^2 \left[ 1 + \left( .276 \frac{\Delta_q}{\sigma} \right)^{1.355} \right] e^{-.5(\frac{\Delta_q}{3\sigma})^2} \quad (21)$$

where $\Delta_q$ is the effective quantization interval.

Generally, the values of the signal power spectrum $S_i(f_i)$ and the noise power spectrum $W(f_i)$ represent variances of random variables. Accordingly, since the quantized modulation transfer function is determined from the ratio of the signal power after quantization to the unquantized signal power, from equation (21) the quantized modulation transfer function $M(f_i)_q$ corresponds to $$M(f_i)_q = \left[ \left[ 1 + \left( .276 \frac{\Delta_q}{\sqrt{S_i(f_i)}} \right)^{1.355} \right] e^{-0.5(\frac{\Delta_q}{3\sqrt{S_i(f_i)}})^2} \right]^{\frac{1}{2}} M''(f_i) \quad (22)$$

where $$S_i(f_i) = \left[ \frac{M(f_i) S_0}{f_i} \right]^2 \quad (23)$$

represents the expectation value of the signal power of the image (reference equation (11) above) and where $\Delta_q$ corresponds to the quantization interval as given by equation (20). Similarly, the quantized Wiener noise spectrum value is given by $$W(f_i)_q = \left[ \left[ 1 + \left( .276 \frac{\Delta_q}{\sqrt{W(f_i)}} \right)^{1.355} \right] e^{-0.5(\frac{\Delta_q}{3\sqrt{W(f_i)}})^2} \right] W''(f_i) \quad (24)$$

For the frequency component $f_i$ corresponding to zero, then the value of the quantized modulation transfer function $M(f_i)_q$ has the value "one," and the value of the quantized Wiener noise spectrum $W(0)_q$ is given by $$W(0)_q = \left[ 1 + \left( .276 \frac{\Delta_q}{8\sqrt{W(0)}} \right)^{1.355} \right] W''(0) \quad (25)$$

The downstream utilization element atoms 122(J) and 123(J) of the modulation transfer function processing chain 122 and the Wiener noise spectrum processing chain 123, respectively, process the modulation transfer function and Wiener noise spectrum provided thereto by respective upstream atoms 122(J-1) and 123(J-1) in relation to the downstream utilization element modulation transfer function information and downstream utilization element Wiener noise spectrum information provided thereto which characterizes the downstream utilization element 12. In the illustrative embodiment, in which the image processing selection information enables molecule 33(0) to be selected in the image integrity molecule class 33 and JPEG compression molecule 35(0) to be selected in the compression molecule, the image processing selection information will also enable the atoms 122(J) and 123(J) to follow immediately respective compression atoms 122(3) and 123(3) in the processing chains 122 and 123. Accordingly, the downstream utilization element processing atoms 122(J) and 123(J) will receive quantized, sharpened, and noise-reduced modulation transfer function and Wiener noise spectrum values $M(f_i)_q$ (equation (22)) and $W(f_i)_q$ (equation (24)) and process them in relation to the modulation transfer function and Wiener noise spectrum, respectively, for the downstream utilization element 12.

It will be appreciated that, if the downstream utilization element 12 is characterized by a modulation transfer function and a Wiener noise spectrum represented by $M_{DOWN}(f_i)$ and $W_{DOWN}(f_i)$, respectively, it would, for example, in rendering an image, process the image information that is provided thereto, by multiplying the modulation transfer function of the image by the modulation transfer function characterizing the downstream utilization device 12, and by adding the Wiener noise spectrum characterizing the image to the Wiener noise spectrum characterizing the downstream utilization device 12. That is, if the image information as input to the downstream utilization element 12 is characterized by the modulation transfer function $M_{IM}(f_i)$ and Wiener noise spectrum $W_{IM}(f_i)$, the rendered image would effectively be characterized by $M_{DOWN}(f_i) * M_{IM}(f_i)$, where "*" represents the multiplication operation, and $W_{DOWN}(f_i) + W_{IM}(f_i)$. Accordingly, since in the illustrative embodiment described above the processed image data coupled to the downstream utilization element is effectively represented by the quantized sharpened noise-reduced modulation transfer function and Wiener noise spectrum $M(f_i)_q$ and $W(f_i)_q$, respectively, the modulation transfer function downstream utilization element atom 122(J) generates a processed modulation transfer function output $M'(f_i)_q$ as $$M'(f_i)_q = M_{DOWN}(f_i) * M(f_i)_q \quad (26)$$

and the Wiener noise spectrum downstream utilization element atom 123(j) generates the Wiener noise spectrum downstream utilization element value as $$W'(f_i)_q = W_{DOWN}(f_i) + W(f_i)_q \quad (27)$$

If the modulation transfer function $M_{DOWN}(f_i)$ and Wiener noise spectrum $W_{DOWN}(f_i)$ of the downstream utilization element 12 are not specified, in one embodiment it is assumed that they have the values one and zero respectively; essentially, it is assumed that the downstream utilization element 12 does not affect the modulation transfer function input thereto and that it is noiseless; that is, that it would transmit the image input thereto substantially unchanged. The $M'(f_i)_q$ and $W'(f_i)_q$ values generated by the downstream utilization element atoms 122(J) and 123(J) represent the outputs of the modulation transfer function processing chain 122 and Wiener noise spectrum processing chain, respectively, and effectively represent the processing of image data in response to the particular preliminary parameter values as provided by the parameter optimization element 125 during the iteration, and further in response to processing that would be performed by the downstream utilization element 12 in, for example, rendering the image.

As described above, the atoms 122(J) and 123(J) couple the $M'(f_i)_q$ and $W'(f_i)_q$ values to the image quality function determination element 124, which processes the values to generate a single image quality function value, which is then used by the parameter optimization element 125 in updating the parameter values to be used by the modulation transfer function processing chain 122 and Wiener noise spectrum processing chain 123 in a subsequent iteration. In one embodiment, the image quality function value determination element 124 generates a single image quality function value in response to two components, namely, a sharpness component which reflects the sharpness of the rendered image as characterized by the modulation transfer function information $M'(f_i)_q$ and a graininess component which reflects the graininess of the rendered image characterized by the Wiener noise spectrum information $W'(f_i)_q$. For both components, the image quality function determination element 124 uses a spectral weighting factor $\omega(f_i)$ defined as $$\omega(f_i) = \frac{E(f_i)}{f_i} \quad (28)$$

where $E(f_i)$ is the spectral response of the eye (or other visual system) for an image at a selected viewing distance. Sharpness of an image for a given frequency component $f_i$ is a function of the value of the modulation transfer function and spectral weighting factor $E(f_i)$ for that frequency component, and an objective measure of the sharpness is defined as the integral of the multiplicative product over the frequency range, normalized by the integral of the spectral weighting factor $\omega(f_i)$ over the same frequency range. Accordingly, in one embodiment, the image quality function determination element generates a sharpness quality factor value SQV in response to the modulation transfer function $M'(f_i)_q$ and spectral weighting factor as $$SQV = \eta_s \left( \frac{\int_0^{f_N} \omega(f_i) M'(f_i)_q d(f_i)}{\int_0^{f_N} \omega(f_i) d(f_i)} \right) \quad (29)$$

where "$\eta_s$" is an arbitrary proportionality constant which, in one embodiment is selected to be one hundred. The integrals in equation (29) are taken over the frequency range from zero to the Nyquist frequency $f_N$. In one embodiment, the image quality function determination element 124 approximates the integrals of equation (29) using the well-known Simpson's approximation rule, and in that embodiment it generates the sharpness quality factor value as $$SQV = \eta_s \left( \frac{\sum_{f_i=f_1}^{f_N} [\omega(f_i) M'(f_i)_q + \omega(f_{i-1}) M'(f_{i-1})_q]}{\sum_{f_i=f_1}^{f_N} [\omega(f_i) + \omega(f_{i-1})]} \right) \quad (30)$$

where $f_i$ is the lowest non-zero frequency component in the series of frequency components $f_i$. The image quality function determination element 124, using the sharpness quality factor value it generates using equation (29), or the approximation it generates using equation (30), generates a sharpness quality metric $Q_S$ to be used in the quality function determination as $$Q_S = \alpha_S SQV + \beta_S \quad (31)$$

where $\alpha_s$ and $\beta_s$ are constants whose values are determined experimentally; in one embodiment the values of constants $\alpha_S$ and $\beta_S$ have been experimentally determined to be 2.068 and −38.66, respectively.

As described above, the Wiener noise spectrum relates to the graininess of the image, either as acquired or as rendered, and so the image quality function determination element 124 uses the Wiener noise spectrum value $W'(f_i)$ q generated by the Wiener noise spectrum processing chain 123 in generating a graininess factor G. Graininess of an image for a given frequency component $f_i$ is a function of the value of the Wiener noise spectrum and the square of the spectral weighting factor $\omega(f_i)$ for that frequency component, and an objective measure of the graininess is defined as the integral of the multiplicative product over the frequency range, normalized by the integral of the square of the spectral weighting factor $\omega(f_i)$ over the same frequency range. Accordingly, in one embodiment, the image quality function determination element 124 generates a graininess value G in response to the Wiener noise spectrum $W'(f_i)_q$ and spectral weighting factor as $$G = \left( \frac{\int_0^{f_N} \omega^2(f_i) W'(f_i)_q d(f_i)}{\int_0^{f_N} \omega^2(f_i) d(f_i)} \right) \quad (32)$$

The integrals in equation (32) are taken over the frequency range from zero to the Nyquist frequency $f_N$. In one embodiment, the image quality function determination element 124 approximates the integrals of equation (32) using the Simpson's approximation rule, and in that embodiment it generates the graininess value as $$G = \left( \frac{\sum_{f_i=f_1}^{f_N} [\omega^2(f_i) W'(f_i)_q + \omega^2(f_{i-1}) W'(f_{i-1})_q]}{\sum_{f_i=f_1}^{f_N} [\omega^2(f_i) + \omega^2(f_{i-1})]} \right) \quad (33)$$

The image quality function determination element 124, using the graininess value that it generates using equation (32), or the approximation it generates using equation (33), generates a graininess metric $Q_G$ to be used in the quality function determination as $$Q_G = \alpha_G \log_{10} G + \beta_G \quad (34)$$

where $\alpha_G$ and $\beta_G$ are constants whose values are experimentally determined; in one embodiment the values of constants $\alpha_G$ and $\beta_G$ have been experimentally determined to be −75.07 and 104.5 respectively.

The image quality function determination element 124 uses the sharpness metric $Q_S$ and graininess metric $Q_G$ to generate an image quality metric value $IM_Q$ using the image quality function $$IM_Q = \frac{1}{\sqrt[n]{\left(\frac{1}{Q_S}\right)^n + \left(\frac{1}{Q_G}\right)^n + \left(\frac{1}{Q_{CEIL}}\right)^n}} \quad (35)$$

Ignoring for the moment the $$\left(\frac{1}{Q_{CEIL}}\right)^n$$

addend in equation (35), the image quality function as set forth in equation (35) is selected so that, if one of the sharpness metric $Q_S$ or the graininess metric $Q_G$ has a relatively large value and the other has a relatively small value, the metric with the relatively small value will generally control the image quality value $IM_Q$. On the other hand, if the sharpness metric $Q_S$ and the graininess metric $Q_G$ have approximately the same value, the image quality value $IM_Q$ will have a value which strongly depends on the values of both metrics. The addend $$\left(\frac{1}{Q_{CEIL}}\right)^n$$

is provided in equation (35) to reflect the experimentally-observed fact that, at high quality levels, as reflected in high values for the sharpness metric $Q_S$ and the graininess metric $Q_G$, there is a leveling off of image quality as observed by an observer. In one embodiment, in which the metrics are generated as described above, with "n" having the value "2.5," the value of $Q_{CEIL}$, which provides a ceiling image quality value, is selected to have a value that minimizes least-square error in the image quality function value of the predicted quality for a large number of psychovisual assessments of particular types of images, and in that embodiment has a value of 118 for certain classes of images, namely, those contained in photographic prints.

As noted above, the modulation transfer function and Wiener noise spectrum processing chains 122 and 123, image quality function determination element 124 and parameter optimization element 125 operate in a series of iterations, during each iteration the modulation transfer function and Wiener noise spectrum processing chains generating respective processed modulation transfer function and Wiener noise spectrum values $M'(f_i)_q$ and $W'(f_i)_q$ (equations (26) and (27)), in response to a set of trial parameters from the parameter optimization element 125, and the image quality function determination element 124 generating the image quality value $IM_q$ (equation (35)) in response to the processed modulation transfer function and Wiener noise spectrum values $M'(f_i)_q$ and $W'(f_i)_q$ generated by the processing chains 122 and 123. As noted above, the parameter optimization element 125, generates a set of values for the parameters $\alpha$, $\beta$, $\gamma$, $\Delta$, and S that maximize the image quality value $IM_q$. When it has identified the set of parameter values that provides that maximum image quality value $IM_q$, it has effectively determined the parameter values that will optimize image processing by the image data processing section 20, and so it provides those parameter values as the image processing parameter data to the image data processing section 20, for use by the noise reduction atoms 93 and 94 (parameters $\alpha$ and $\beta$), the sharpening atom 95 (parameters $\gamma$ and $\Delta$) and the quantization atom 112 (parameter S)

The parameter optimization element 125 may generate the desired set of parameter values using any of a number of well-known methodologies for locating an extremum, in particular, a maximum value, of a function. Several such methodologies are described in chapter 10 of W. Press, et al., *Numerical Recipes In Fortran* 2d ed. (Cambridge University Press, 1992), for example. In one embodiment, the parameter optimization element 125 operates in accordance with a modified "downhill simplex methodology." The downhill simplex methodology, as described, for example, in the aforementioned Press book, at pp. 402–406 is a methodology which, for a particular function (in this case the image quality value $IM_q$) of a plurality "N" of variables (in this case the parameters $\alpha$ and $\beta$ used by the noise reduction atoms 122(1) and 123(1), parameters $\gamma$ and $\Delta$ used by the sharpening atoms 122(2) and 123(2) and parameter S used by the compression atoms 122(3) and 123(3)), enables the identification of an extremum (that is, the maximum or minimum value) of the function and the values of the variables which provide that extremum. In accordance with the downhill simplex methodology, the parameter optimization element 125 generates an initial "simplex," which is represented as an N-dimensional geometric figure. Since the image quality value $IM_q$ is a function of the five parameters $\alpha$, $\beta$, $\gamma$, $\Delta$ and S, the simplex associated with the image quality function $IM_q$ will be represented as a five-dimensional figure (each dimension being associated with one of the variables, or parameters, $\alpha$, $\beta$, $\gamma$, $\Delta$, and S) having six vertices (that is, N+1 vertices, where "N" is the number of independent variables), which may be selected initially at random. In the five-dimensional space, each vertex $V_i$ of the simplex is defined as the five-tuple $(\alpha_i, \beta_i, \gamma_i, \Delta_i, S_i)$ with each vertex $V_i$ having an associated image quality function value $IM_{qi}$.

In accordance with the downhill simplex methodology, the parameter optimization element 125 will establish an initial set of six vertices defining the initial simplex, by selecting at random six different sets of values of the trial parameters $\alpha_i$, $\beta_i$, $\gamma_i$, $\Delta_i$, and $S_i$ ("i" being an integer from 1 to 6) to represent six vertices $V_i$ defining the simplex, and, for each set "i," enabling the modulation transfer function and Wiener noise spectrum processing chains 122 and 123 and the image quality function determination element 124 to generate the image quality value $IM_{qi}$ as described above. After image quality values $IM_{qi}$ have been generated for all six of the initial sets of parameters $\alpha_i$, $\beta_i$, $\gamma_i$, $\Delta_i$, and $S_i$, ("i" being an index from 1 to 6), the parameter optimization element 125 generates a new set of parameters $\alpha_7$, $\beta_7$, $\gamma_7$, $\Delta_7$, and $S_7$7, representing a new vertex $V_7$ for the simplex to be substituted for the vertex $V_i$ represented by one of the six original sets $\alpha_i$, $\beta_i$, $\gamma_i$, $\Delta_i$, and $S_i$, namely, the vertex $V_I$ which gave rise to the lowest value for the image quality function $IM_{qI}$. In generating the new vertex $V_7$, the parameter optimization element 125 performs one of a number of operations in connection with the selected vertex $V_I$, to try to obtain a new vertex whose parameter values $\alpha_7$, $\beta_7$, $\gamma_7$, $\Delta_7$, and $S_7$ provide an image quality value $IM_{q7}$ which is better than the image quality value $IM_{qI}$ associated with the vertex $V_I$. The parameter optimization element 125 can perform a number of types of operations in connection with the simplex including (a) reflecting the selected vertex $V_i$ through the opposite face of the simplex, while preserving its volume, (b) reflection of the selected vertex $V_i$ and expansion or contraction in a direction orthogonal to the opposite face, and (c) contraction of one or more faces.

In generating the new vertex $V_7$, the parameter optimization element 125 will, using the above-described operations, generate a new trial vertex $V_7^T$ comprising a set of trial parameter values $\alpha_7^T$, $\beta_7^T$, $\gamma_7^T$, $\Delta_7^T$, and $S_7^T$ which the parameter optimization element 125 provides to the modulation transfer function and Wiener noise spectrum processing chains 122 and 123 and image quality function determination element 124 to generate a trial image quality value $IM_{q7}^T$. If the trial image quality value $IM_{q7}^T$ is higher than at least the second lowest trial image quality value $IM_{qi}$, the parameter optimization element 125 will use the trial vertex $V_7^T$ associated with the trial image quality value $IM_{q7}^T$ as the new vertex $V_7$ for the simplex. Otherwise, if the trial image quality value $IM_{q7}^T$ generated in response to the new trial vertex $V_7^T$ is not higher than at least the second lowest trial image quality value $IM_{qi}$, it will perform others of the selected operations, described above, or combinations thereof, in connection with the selected vertex $V_l$, to find another new trial vertex $V_7^T$ and repeat these operations. The parameter optimization element 125 will repeat these operations until it identifies a trial vertex $V_7^T$ for which the trial image quality value $IM_{q7}^T$ whose value is higher than at least the second lowest trial image quality value $IM_{qi}$, and will use that trial vertex $V_7^T$ as the new vertex $V_7$.

The parameter optimization element 125 will repeat the above-described operations through a series of iterations, during each iteration generating a new vertex $V_i$ ("i" being an index greater than 7) to replace the vertex associated with the lowest image quality value $IM_q$. The iterations will be continued until a selected termination criterion is satisfied. In one embodiment, the parameter optimization element 125 will preferably terminate when the highest image quality values $IM_{qi}$ for at least some of the vertices defining the simplex are within a selected tolerance value. In addition, it will be appreciated that a predetermined maximum number of iterations may be specified for the parameter optimization element 125, and the parameter optimization element 125 may terminate after it performs the predetermined maximum number of iterations, if the previously-described preferred termination criterion has not been satisfied. After the parameter optimization element 125 has terminated processing, at least in connection with the first termination criterion, it will provide the values of the parameters associated with the highest image quality value $IM_q$ to the image data processing section 20 for use in processing the image data as described above. (The second termination criterion, based on a selected maximum number of iterations, may be provided to accommodate, for example, error conditions or conditions in which no maximum image quality value $IM_q$ can be determined, and if iterations terminate in response to that criterion the parameter optimization element 125 may provide the values of the parameters associated with the vertex $V_i$ having the highest image quality value $IM_q$ to the image data processing section 20. Alternatively, the parameter optimization element 125 may repeat the downhill simplex methodology using a new simplex with new randomly-generated vertices.)

In one specific embodiment, the values of the various parameters $\alpha$, $\beta$, $\gamma$, $\Delta$ and $S$ are limited to predetermined ranges. In that embodiment, if, in locating a trial vertex $V_i^T$ the trial value of one or more of the parameters specifying the trial vertex is outside the parameter's range, the parameter optimization element 125 provides a penalty function which effectively reduces the trial image quality value associated with the trial vertex, with the penalty function being proportional to the extent to which the parameter's value is outside its predetermined range. As an alternative, in generating the trial vertices $V_i^T$, the parameter optimization element 125 may be limited to vertices which are within the various parameters' predetermined ranges.

As described above, the modulation transfer function processing chain 122 and the Wiener noise spectrum processing chain 123 are provided to process image data source and downstream utilization element characteristic data that effectively define the processing performed by the image data source 11 and, for example, rendered by the downstream utilization element 12, in a manner corresponding to the way in which the actual image data would be processed by the molecules of the image data processing section 20 as selected in response to the image processing operation selection information provided by the operator. Accordingly, the specific set of atoms which would be provided in the modulation transfer function and Wiener noise spectrum processing chains 122 and 123 will correspond to the specific set of molecules 32(j), 33(k), 34(l) and 35(m) from the various molecule classes 32–35, as well as the specific atoms in the respective molecules which are enabled. In addition, atoms may be provided in the modulation transfer function and Wiener noise spectrum processing chains 122 and 123, that are related to specific processing operations as specified by the operator, but for which parameters are not to be generated. Generally, the atoms of the modulation transfer function and Wiener noise spectrum processing chains 122 and 123 will correspond to enabled atoms of the selected molecules 32(j), 33(k), 34(l) and 35(m) which perform spatial processing in connection with the image data.

In addition, it will be appreciated that a number of variations may be made in connection with the specific image quality value as provided by the image quality function determination element 124. For example, the image quality function determination element 124 may, in addition to providing the image quality value $IM_q$ as described above in connection with equation (35), or as an alternative to providing such an image quality value, provide an image quality value which reflects selected characteristics of the image data source 11 and downstream utilization element 12. As an illustration, the image quality function determination element 124 may generate, in response to the image quality value $IM_q$ as described above, a color-balance corrected image quality value which, in one embodiment, is selected as $$IM_{CB} = IM_q e^{-\left(\frac{\Delta E}{E_0}\right)^2} \qquad (36)$$

where "$\Delta E$" represents the color reproduction error of the downstream utilization element, based on a sample image of uniform predetermined color, and $E_0$ is a scale factor, and provide it to the parameter optimization element 125. The color-balance corrected image quality value $IM_{CB}$ thus generated reflects the fact that the image quality of the, for example, rendered image as perceived by an observer is affected by the color balance of the image data as generated by the image data source 11 or the image as rendered by the downstream utilization element 12. Other modifications will be apparent to those skilled in the art.

The image processing system 10 provides a number of advantages. In particular, it facilitates the optimal processing of image data provided by a variety of types of image data sources and for use by a variety of types downstream utilization elements based on the specific types of processing operations as selected by an operator. The set of processing operations that are selected, as well as the order in which they are to be applied, affect the, for example, appearance of the image as rendered by the image data source, and the system 10, using source characteristic data and downstream utilization element characteristic data representing an optimal or reference image, automatically determines a set of optimal values for a variety of parameters that are used in processing the image data so as to provide optimal image quality for the actual image data.

It will be appreciated that the image processing system 10 may be implemented in special purpose hardware, or in a suitably programmed general purpose digital computer system. Alternatively selected portions of the image processing system may be implemented in special purpose hardware and other portions in a suitably programmed general purpose digital computer system. For example, a variety of integrated circuit chip manufacturers provide special-purpose processing circuits for processing image data in accordance with the aforementioned JPEG standard, and implementation of the image processing system using such circuits will be readily apparent to those skilled in the art. An illustrative circuit is, for example, a CW702 JP2EG core provided by LSI Logic Corporation.

The foregoing description has been limited to a specific embodiment of this invention. It will be apparent, however, that variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An image processing system for receiving image data from an image data source, performing at least one image processing operation of a plurality image processing operations in connection with image processing selection information to generate psychovisually optimized processed image data, and providing the psychovisually optimized processed image data to a downstream utilization element, the image processing system characterized by:

A. an image data processing section for performing said at least one image processing operation in connection with image data input thereto, the image data processing section performing said at least one image processing operation in relation to processing operation parameter information to generate said psychovisually optimized processed image data; and B. a characteristic processing section for receiving source characteristic information and downstream utilization element characteristic information defining at least one selected characteristic of said image data source and downstream utilization element and for generating said processing operation parameter information in response to the image processing selection information, the source characteristic information, the downstream utilization element characteristic information, and predetermined psychovisual attributes, said processing operation parameter information enabling the image data processing section to generate the psychovisually optimized processed image data.

2. The image processing system of claim 1 in which the image data processing section includes a plurality of image processing atoms each for performing one of said plurality of image processing operations, and an image processing control for selecting ones of said image processing atoms and enabling the selected image processing atoms to process the image data in response to the image processing selection information.

3. The image processing system of claim 2 in which one of said plurality of image processing atoms operates in response to the processing operation parameter information generated by the characteristic processing section, the image processing control enabling said one of said plurality of image processing operations in response to the processing operation parameter information generated in response to the image processing selection information.

4. The image processing system of claim 2 in which at least two of said plurality of image processing atoms comprise an image processing molecule for performing ones of said plurality of image processing operations in a predefined order, the image processing control selecting and enabling each said image processing molecule and atoms therein in response to the image processing selection information.

5. The image processing system of claim 4 in which at least two of the image processing molecules comprise a molecule class, said at least two of the image processing molecules in each said molecule class performing a preselected type of image processing operation, the image processing control selecting and enabling each said image processing molecule and atoms therein in response to the image processing selection information.

6. The image processing system of claim 5 in which one said molecule class is a data decompression molecule class including a plurality of image processing molecules each for performing image data decompression in accordance with a selected decompression methodology, the image processing control selecting one of said plurality of image processing molecules from the decompression molecule class in response to decompression methodology information.

7. The image processing system of claim 5 in which one said molecule class is an image integrity molecule class including a plurality of image integrity molecules each for performing a series of image processing operations in connection with spatial image information, the image processing control selecting one of said plurality of image integrity molecules from the image integrity molecule class in response to image integrity selection information in said image processing selection information.

8. The image processing system of claim 5 in which one molecule class is a special effects molecule class including a plurality of special effects molecules each for performing a series of special effects image processing operations, the image processing control selecting one of said plurality special effects molecules from the special effects molecule class in response to special effects selection information in said image processing selection information.

9. The image processing system of claim 5 in which one molecule class is a compression molecule class including a plurality of image processing molecules each for performing image data compression in accordance with a selected compression methodology, the image processing control selecting one of said plurality of image processing molecules from the compression molecule class in response to compression methodology information in said image processing selection information.

10. The image processing system of claim 1 in which said characteristic processing section includes:

A. a parameter optimization element for generating trial parameter values;

B. a reference image quality value determination element for generating, in response to a reference image and said trial parameter values, a reference image quality value from both the source characteristic information and the downstream utilization element characteristic information;

C. an iteration control element for controlling the parameter optimization element and said reference image quality value determination element to enable the parameter optimization element through a series of iterations to generate said trial parameter values for providing said reference image quality value having an optimal value, and for providing said image data processing section with said processing operation parameter information, being said trial parameter values, when said reference image quality value equals said optimal value.

11. The image processing system of claim 10 in which the reference image quality value determination element comprises:
   A. a reference profile generator for performing a processing operation corresponding to said at least one image processing operation performed by the image data processing section in connection with the source characteristic information and the downstream utilization element characteristic information to generate a plurality of reference image profile values; and
   B. a quality value determination element for generating said reference image quality value in response to the plurality of reference image profile values.

12. The image processing system of claim 11 in which the source characteristic information and the downstream utilization element characteristic information both include modulation transfer function information and noise power spectrum information, said reference profile generator generating both a modulation transfer function profile value in response to the modulation transfer function information and a noise power spectrum profile value in response to the noise power spectrum information, said quality value determination element further generating said reference image quality value in response to both the modulation transfer function profile value and the noise power spectrum profile value.

13. The image processing system of claim 12 in which the quality value determination element further generates a sharpness quality value in response to the modulation transfer function profile value and a spectral weighting factor, said quality value determination element further generating said reference image quality value in response to the sharpness quality value.

14. The image processing system of claim 12 in which the quality value determination element further generates a graininess value in response to the noise power spectrum profile value and a spectral weighting factor, said quality value determination element further generating said reference image quality value in response to the graininess value.

15. An image processing method for processing image data received from an image data source, performing at least one image processing operation in connection with image processing selection information to generate psychovisually optimized processed image data, and providing the psychovisually optimized processed image data to a downstream utilization element, said method characterized by:
   A. receiving source characteristic information from the image data source and downstream utilization element charateristic information from the downstream utilization element, said source characteristic information and downstream utilization element characteristic information defining at least one selected characteristic of said image data source and said downstream utilization element, and generating processing operation parameter information in response to the image processing selection information, the source characteristic information, the downstream utilization element characteristic information, and predetermined psychovisual attributes, said processing operation parameter information enabling an image data processing section to generate the psychovisually optimized processed image data; and
   B. performing said at least one image processing operation in the image data processing section to generate a processed image from said psychovisually optimized processed image data in response to said processing operation parameter information.

16. The image processing method of claim 15 in which a series of said at least one image processing operations are performed in an order as selected by the image processing selection information.

17. The image processing method of claim 16 in which at least one of said series of said at least one image processing operation is performed using the processing operation parameter information.

18. The image processing system of claim 17 in which said at least one image processing operation is grouped into a predefined image processing operation sequence in accordance with said image processing selection information.

19. The image processing method of claim 18 in which the predefined image processing operation sequence is grouped into a sequence class, said predefined image processing operation sequence in each said sequence class defining one of a number of selected types of image processing operations, the predefined image processing operation sequence to be performed in each said sequence class in response to the image processing selection information.

20. The image processing method of claim 19 in which one said sequence class is a data decompression operation class including a plurality of said predefined image processing operation sequences each performing image data decompression in accordance with a selected decompression methodology, the image processing selection information including decompression methodology information to identify said predefined image processing operation sequence.

21. The image processing method of claim 19 in which one said sequence class is an image integrity operation class including a plurality of said predefined image processing operation sequences each performing said series of said at least one image processing operations in connection with spatial image information, the image processing selection information including image integrity selection information to identify said predefined image processing operation sequence related to image operations.

22. The image processing method of claim 19 in which one said sequence class is a special effects operation class including a plurality of said predefined image processing operation sequences each performing said series of said at least one image processing operations in relation to special effects, the image processing selection information including special effects selection information to identify said predefined image processing operation sequence related to special effects.

23. The image processing method of claim 19 in which one said sequence class is a data compression operation class including a plurality of said predefined image processing operation sequences each performing image data compression in accordance with a selected compression methodology, the image processing selection information including compression methodology information to identify said predefined image processing operation sequence.

24. The image processing method of claim 15 in which said step 15A includes:
   A. generating trial parameter values;
   B. generating a reference image quality value from both the source characteristic information defining image processing by the image data source, and the downstream utilization element characteristic information, in response to reference image information and the trial parameter values;

C. in a series of iterations, controlling both the trial parameter values and the reference image quality value in response to the processing operation parameter information to generate said trial parameter values for providing an optimal value of said reference image quality value.

25. The image processing method of claim 24 in which the generating step 24B comprises:

A. performing a processing operation corresponding to said at least one image processing operation in response to both the source characteristic information and the downstream utilization element characteristic information to generate a reference image profile value; and B. generating the reference image quality value in response to the reference image profile value.

26. The image processing method of claim 25 in which both the source characteristic information and the downstream utilization element characteristic information include modulation transfer function information and noise power spectrum information, said method further comprising:

generating a modulation transfer function profile value from said modulation transfer function information in step 25A;

generating a noise power spectrum profile value from said noise power spectrum information in step 25A; and generating said reference image quality value in step 25B in response to both said modulation transfer function profile value and the noise power spectrum profile value.

27. The image processing method of claim 26 wherein said step of generating said reference image quality value further comprises:

generating a sharpness quality value in response to both the modulation transfer function profile value and a spectral weighting factor; and generating said reference image quality value in response to the sharpness quality value.

28. The image processing method of claim 26 wherein said step of generating said reference image quality value further comprises generating a graininess value in response to both the noise power spectrum profile value and a spectral weighting factor, and generating said reference image quality value from the graininess value.

29. The image processing method of claim 15 in which said image processing selection information is provided from memory or from an operator.

30. An image processing system for receiving input image data defining an input image from image source, processing the input image data in accordance with at least one image processing operation, and generating output image data corresponding to an output image in which predetermined psychovisual attributes have been automatically optimized for a select downstream application and the at least one image processing operation, said system comprising:

means for acquiring the input image data formatted as a plurality of input image data points corresponding, respectively, to pixels of the input image and objective metrics correlated with the predetermined psychovisual attributes of the input image;

a characteristic processing section for utilizing said objective metrics to evaluate an effect that the at least one image processing operation and the select downstream application will have on said objective metrics of the input image data, automatically selecting an optimal application of the at least one image processing operation, and generating processing parameter information for dictating a sequence and degree to which said optimal application of the at least one image processing operation is to be applied to the input image data; and an image data processing section for receiving the input image data and said processing parameter information and in response thereto applying the at least one image processing operation to the input image data in accordance with said image processing parameter information to transform the input image data into the output image data for constructing the output image having optimal perceived quality.

31. An image process method for receiving input image data defining an input image from an image source, processing the input image data in accordance with at least one image processing operation, and generating output image data defining an output image in which predetermined psychovisual attributes have been automatically optimized for a select downstream application and the at least one image processing operation, said method comprising the steps of:

acquiring the image data formatted as a plurality of input image data points corresponding, respectively, to pixels of the input image and objective metrics con dated with the predetermined psychovisual attributes of the input image;

evaluating an effect that the at least one image processing operation and the select downstream application will have on said objective metrics of the input image data;

automatically selecting an optimal application of the at least one image processing operation;

generating processing parameter information for dictating a sequence and degree to which the at least one image processing operation is to be applied to the input image data; and applying the at least one image processing operation to the input image data in accordance with said processing parameter information to transform the input image data into the output image data for constructing the out image having optimal/perceived image quality.

* * * * *